US011591757B2

(12) United States Patent
O'Donnell

(10) Patent No.: US 11,591,757 B2
(45) Date of Patent: Feb. 28, 2023

(54) SYSTEM AND METHOD FOR MACHINE CONTROL

(71) Applicant: Caterpillar Paving Products Inc., Brooklyn Park, MN (US)

(72) Inventor: Timothy M. O'Donnell, Long Lake, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 362 days.

(21) Appl. No.: 16/386,923

(22) Filed: Apr. 17, 2019

(65) Prior Publication Data
US 2020/0332479 A1  Oct. 22, 2020

(51) Int. Cl.
| | | |
|---|---|---|
| *E01C 19/00* | (2006.01) | |
| *E01C 19/48* | (2006.01) | |
| *G06Q 50/08* | (2012.01) | |
| *B23Q 17/24* | (2006.01) | |
| *E01C 23/07* | (2006.01) | |

(52) U.S. Cl.
CPC ........ *E01C 19/004* (2013.01); *B23Q 17/2414* (2013.01); *B23Q 17/2428* (2013.01); *E01C 19/48* (2013.01); *E01C 23/07* (2013.01); *G06Q 50/08* (2013.01)

(58) Field of Classification Search
CPC ........ E01C 19/004; E01C 19/48; E01C 23/07; B23Q 17/2414; B23Q 17/2428; G06Q 50/08
See application file for complete search history.

(56) References Cited

U.S. PATENT DOCUMENTS

| 6,778,097 B1 | 8/2004 | Kajita et al. |
|---|---|---|
| 7,398,137 B2 | 7/2008 | Ferguson et al. |

(Continued)

FOREIGN PATENT DOCUMENTS

| JP | 61062905 | 3/1986 |
|---|---|---|
| JP | 08079148 | 8/1994 |

(Continued)

OTHER PUBLICATIONS

Emoto, Kengo et al. "Work environments construction for an autonomous robot." 2014 International Symposium on Micro-NanoMechatronics and Human Science (MHS) (2014): 1-2. (Year: 2014).*

*Primary Examiner* — Rachid Bendidi
*Assistant Examiner* — Selena M Jin
(74) *Attorney, Agent, or Firm* — Lee & Hayes, P.C.

(57) ABSTRACT

A method includes receiving information indicative of a first worksite plan, determining a travel path extending along a work surface, causing a mobile machine to traverse the travel path, and receiving first sensor information associated with the work surface from a sensor of the mobile machine. The method also includes generating a second worksite plan based at least partly on the first sensor information, and providing instructions to a slave machine which, when executed by a controller of the slave machine, cause the controller of the slave machine to control the slave machine to perform at least part of the second worksite plan. The method further includes receiving second sensor information determined by the sensor of the mobile machine, and generating at least one of a safety metric and an accuracy metric based at least partly on the second sensor information.

22 Claims, 5 Drawing Sheets

(56) References Cited

U.S. PATENT DOCUMENTS

| | | | |
|---|---|---|---|
| 8,209,075 B2 * | 6/2012 | Senneff | A01B 69/008 |
| | | | 701/23 |
| 9,096,977 B2 | 8/2015 | Fritz et al. | |
| 9,879,386 B2 | 1/2018 | Marsolek | |
| 9,983,578 B2 | 5/2018 | Kandula et al. | |
| 2006/0224280 A1 | 10/2006 | Flanigan et al. | |
| 2007/0214687 A1 * | 9/2007 | Woon | G06T 17/30 |
| | | | 37/415 |
| 2014/0081505 A1 * | 3/2014 | Klinger | G08G 5/0021 |
| | | | 701/25 |
| 2014/0293047 A1 | 10/2014 | Morris | |
| 2016/0120095 A1 * | 5/2016 | Fujimoto | G05D 1/0219 |
| | | | 701/24 |
| 2016/0188977 A1 * | 6/2016 | Kearns | G06V 40/172 |
| | | | 348/113 |
| 2017/0054947 A1 | 2/2017 | Longanbach | |
| 2018/0196438 A1 * | 7/2018 | Newlin | G03B 15/006 |
| 2018/0210092 A1 * | 7/2018 | Shinkai | G05D 1/0278 |
| 2018/0217610 A1 * | 8/2018 | Schuh | G06V 20/56 |
| 2019/0114847 A1 * | 4/2019 | Wagner | G05D 1/0016 |
| 2019/0304311 A1 * | 10/2019 | Shinkai | G08G 1/09 |
| 2019/0325089 A1 * | 10/2019 | Golparvar-Fard | |
| | | | G06F 3/04815 |
| 2020/0049514 A1 * | 2/2020 | Grandi | G06T 7/10 |
| 2020/0150687 A1 * | 5/2020 | Halder | G08G 1/09 |

FOREIGN PATENT DOCUMENTS

| | | | |
|---|---|---|---|
| JP | 07221693 | 8/1995 | |
| JP | 10088624 | 4/1998 | |
| JP | 2007061042 | 3/2007 | |
| JP | 2010053609 | 3/2010 | |
| JP | 2012202124 | 10/2012 | |
| WO | WO2015147140 | 10/2015 | |
| WO | WO-2020109462 A1 * | 6/2020 | E21F 13/00 |

\* cited by examiner

SYSTEM AND METHOD FOR MACHINE CONTROL

TECHNICAL FIELD

The present disclosure relates to a system for controlling the operation of a machine. More specifically, the present disclosure relates to a system configured to control the operation of a slave machine based at least in part on information received from an autonomous or semi-autonomous master machine.

BACKGROUND

At a paving, construction, mining, or other such worksite, one or more heavy-duty machines can be used to modify a work surface. For example, in some paving worksites, an excavator, cold planer or other such machine may be employed to remove a portion (e.g., a top layer) of the work surface to expose a paving surface. In such examples, once the paving surface is exposed, one or more other machines (e.g., a paving machine, a compaction machine, etc.) may be used to perform further operations on the paving surface until a desired outcome is reached at the worksite.

Due to the size of many worksites, the large number of machines in operation at such worksites, and the complexity of the operations being performed by such machines, it can be difficult to coordinate the activities of such machines. This difficulty increases when autonomous or semi-autonomous machines are used to perform various operations at the worksite. For instance, it may be difficult for large, heavy-duty, autonomous machines to determine the contours, boundaries, and other characteristics of the work surface before beginning operations at the worksite. As a result, such machines may be prone to damage and/or failure caused by encountering unexpected obstacles at the worksite. Additionally, while such machines may employ onboard sensors to identify other machines, workers, or other objects disposed on the work surface, the fields of view of the respective sensors may be at least partially blocked by conveyors, booms, sticks, implements, and other components of such machines. As a result, the effectiveness of such sensors may suffer, thereby increasing the risk of machine damage and potentially putting such objects in harm's way. Moreover, due to the rugged conditions at most worksites, it may not be desirable to mount relatively expensive and delicate sensors on such machines since such sensors may be easily damaged in such conditions.

An example system for use in controlling various machines is described in U.S. Pat. No. 9,879,386 (hereinafter referred to as the '386 patent). In particular, the '386 patent describes a system for coordinating operations of a cold planer and a paving machine at a worksite. The system described in the '395 patent also includes a sensor operable to generate a signal indicative of a position of the cold planer, a production monitoring system associated with the cold planer, and a communicating device operable to exchange information between the cold planer and the paver. The '386 patent does not, however, describe examples in which sensors may be utilized to determine the contour, boundary, and/or other characteristics of the worksite, as well as the presence and location of various objects at the worksite, without the respective fields of view of such sensors being at least partly obstructed. Moreover, the '386 patent fails to describe examples in which such sensors may also be utilized to monitor the performance of various operations by the machines at the disclosed worksite.

Example embodiments of the present disclosure are directed toward overcoming the difficulties described above.

SUMMARY

In an aspect of the present disclosure, a method includes receiving information indicative of a first worksite plan, the first worksite plan corresponding to a worksite having a work surface, determining a mobile machine travel path extending along the work surface based at least partly on the information, causing an autonomous mobile machine to traverse the mobile machine travel path, and receiving first sensor information associated with the work surface. In such examples, the first sensor information is determined by at least one sensor of the autonomous mobile machine as the autonomous mobile machine traverses the mobile machine travel path. The method also includes generating a second worksite plan based at least partly on the first sensor information, the second worksite plan corresponding to the worksite and a slave machine disposed at the worksite, and providing instructions to the slave machine which, when executed by a controller of the slave machine, cause the controller of the slave machine to control the slave machine to perform at least part of the second worksite plan. The method further includes receiving second sensor information determined by the at least one sensor, the second sensor information being indicative of the slave machine performing the at least part of the second worksite plan at the worksite. The method also includes generating at least one of a safety metric and an accuracy metric based at least partly on the second sensor information.

In another aspect of the present disclosure, a system includes an autonomous mobile machine having at least one sensor, a first controller in communication with the at least one sensor, and a slave machine in communication with the first controller via a network. The first controller is configured to receive first sensor information associated with a work surface of a worksite, wherein the first sensor information is determined by the at least one sensor as the autonomous mobile machine traverses a mobile machine travel path defined by the work surface, and to generate a worksite plan based at least partly on the first sensor information. The first controller is also configured to provide instructions to the slave machine which, when executed by a second controller of the slave machine, cause the second controller to control the slave machine to perform at least part of the worksite plan. The first controller is further configured to receive second sensor information determined by the at least one sensor, the second sensor information being indicative of the slave machine performing the at least part of the worksite plan at the worksite. The first controller is also configured to generate at least one of a safety metric and an accuracy metric based at least partly on the second sensor information.

In yet another aspect of the present disclosure, an autonomous mobile machine includes a first controller, a communication device in communication with the first controller, and at least one sensor in communication with the first controller. In such examples, the first controller is configured to receive first sensor information associated with a work surface of a worksite, wherein the first sensor information is determined by the at least one sensor as the autonomous mobile machine traverses a mobile machine travel path defined by the work surface. The first controller is also configured to generate a worksite plan based at least partly on the first sensor information, and to provide, using the communication device and via a network, first instructions to a slave machine disposed at the worksite, wherein when the first instructions are executed by a second controller of the slave machine, the first instructions cause the second controller to control the slave machine to perform at least part of the worksite plan. The first controller is further configured to receive second sensor information determined by the at least one sensor, the second sensor information being indicative of the slave machine performing the at least part of the worksite plan at the worksite. The first controller is also configured to generate at least one of a safety metric and an accuracy metric based at least partly on the second sensor information, and to provide second instructions to the slave machine based at least partly on the at least one of the safety metric and the accuracy metric, the first controller providing the second instructions using the communication device and via the network.

DETAILED DESCRIPTION

Figure 1:
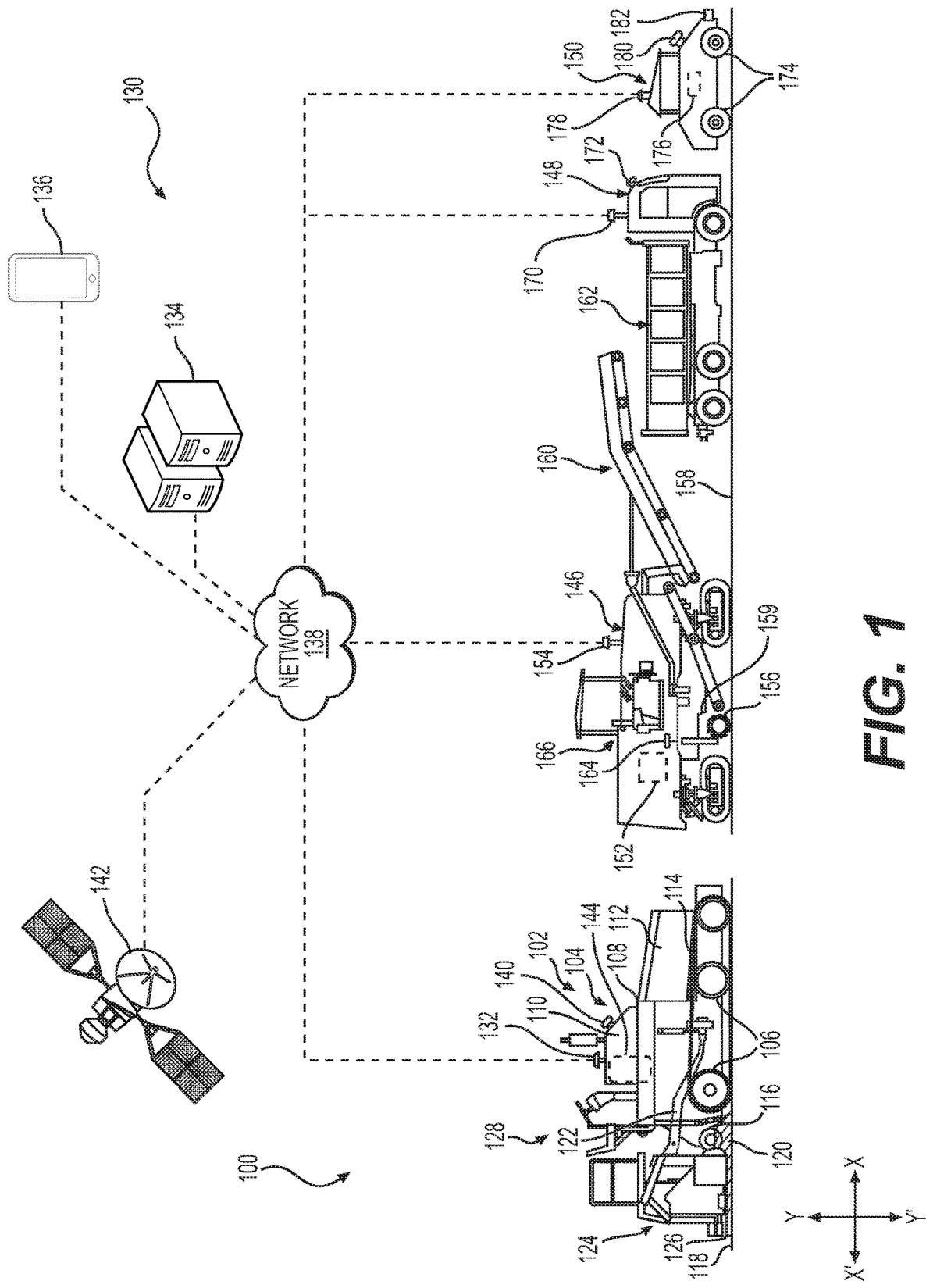
FIG. 1 is a perspective view of a system (e.g., a paving system) in accordance with an example embodiment of the present disclosure. The example system shown in FIG. 1 includes a master machine and several slave machines. In further examples, such a system may include machines other than and/or in addition to the machines illustrated in FIG. 1.

Wherever possible, the same reference numbers will be used throughout the drawings to refer to the same or like parts. FIG. 1 shows an example system 100 (e.g., an example paving system) of the present disclosure. The example system 100 includes at least one machine configured for use in one or more construction, mining, milling, excavating, hauling, compacting, paving, or other such processes. In particular, as will be described in greater detail below, the system 100 may include a slave machine, and a separate master machine configured to traverse a portion of a work surface ahead of the slave machine. The master machine may comprise, for example, a mobile machine including one or more sensors configured to determine one or more characteristics of the work surface. The one or more sensors of the master machine may also be configured to determine, for example, the presence and/or location of one or more objects disposed on and/or at least partly beneath the work surface. As will be described below, the master machine may generate a worksite plan based at least partly on sensor information received from the one or more sensors, and may provide instructions and/or other information to a controller or other component of the slave machine corresponding to the worksite plan. In such examples, the slave machine may traverse a slave machine travel path, act on and/or otherwise modify a portion of the work surface, and/or otherwise perform at least part of the worksite plan based at least partly on instructions and/or other information received from the master machine. Additionally, the one or more sensors of the master machine may be used to monitor the location of the slave machine as well as the performance of the worksite plan by the slave machine. As a result of such a control methodology, contact between the slave machine and various objects located at the worksite may be avoided, thereby reducing the risk of damage to the slave machine, as well as reducing the risk of harm and/or damage to such objects. Additionally, by monitoring the progress of the slave machine, and occasionally modifying operation of the slave machine in order to improve performance, the efficiency of the system 100 may be improved. Further, because the one or more sensors are disposed on the maser machine, and not the slave machine, such sensors may accurately and effectively monitor the location of the slave machine, the performance of the worksite plan by the slave machine, and/or the presence or location of objects located at the worksite, without the respective fields of view of such sensors being obstructed.

With reference to FIG. 1, the example system 100 may include one or more slave machines configured to receive operating instructions from a master machine. As used herein, the term "slave machine" may indicate a machine configured to receive instructions from a separate source (e.g., from a master machine), and to operate in response to, in accordance with, and/or based at least partly on such instructions. As used herein, the term "master machine" may indicate a machine configured to receive sensor information, information indicative of a worksite plan, and/or other information associated with a worksite, to generate one or more instructions based at least partly on such information, and/or to provide instructions (e.g., operating instructions) to one or more slave machines. One or more of the slave machines described here and/or one or more of the master machines described herein may comprise operator-controlled machines, semi-autonomous machines, or fully-autonomous machines. Unless otherwise specified, and for ease of description, the example slave machines and master machines will be described below as comprising fully-autonomous machines. Additionally, while the system 100 shown in FIG. 1 is illustrated as a paving system including a paving machine, a cold planer, a haul truck, and/or other machines, it is understood that in other examples, the system 100 may comprise a construction system, a mining system, and/or any other such system, and in such examples, the system 100 may include machines (e.g., a wheel loader, a track-type tractor, a dozer, a backhoe, etc.) different from those shown in FIG. 1.

In the example embodiment of FIG. 1, and for ease of description, an example slave machine 102 may comprise a paving machine configured for use in road or highway construction, parking lot construction, and other allied industries. Such an example slave machine 102 (e.g., a paving machine) may comprise any machine configured for use in depositing heated asphalt, concrete, or like materials. As shown in FIG. 1, such an example slave machine 102 may include a tractor portion 104 supported on a set of ground-engaging elements 106. The tractor portion 104 may include a tractor frame 108, as well as a power source 110 for driving the ground-engaging elements 106. Although the ground engaging elements 106 are illustrated as wheels, it should be understood that the ground engaging elements 106 may be any other type of ground engaging elements such as, for example, continuous tracks, etc. The power source 110 may be a conventional internal combustion engine operating on fossil or hybrid fuels, or an electrically operated drive powered by alternate energy sources. The slave machine 102 may also include a hopper 112 for storing paving material. The slave machine 102 may further include a conveyor system 114 for conveying the paving material from the hopper 112 to other downstream components of the slave machine 102. For example, the slave machine 102 may include an auger assembly 116 which receives the paving material supplied via the conveyor system 114, and distributes the paving material onto a paving surface 118. Such paving material is illustrated as item 120 in FIG. 1. In such examples, the auger assembly 116 may be configured to distribute the paving material 120 across substantially an entire width of the slave machine 102.

The slave machine 102 may further include a tow arm 122 which couples a height-adjustable screed portion 124 to the tractor portion 104. The tow arm 122 may be actuated by a hydraulic actuator, an electric actuator (not shown), and/or any other type of actuator as per application requirements, and raising or lowering the tow arm 122 may result in commensurate raising or lowering of the screed portion 124. The screed portion 124 may include one or more augers, rollers, and/or other components configured to assist in spreading and/or compacting the paving material 120 into a mat 126 on the paving surface 118.

As shown in FIG. 1, an operator station 128 may be coupled to the tractor portion 104. The operator station 128 may include a console and/or other levers or controls for operating the slave machine 102. For example, the console may include a control interface for controlling various functions of the slave machine 102. The slave machine 102 may also include a communication device 132. Such communication devices 132 may be configured to permit wireless transmission of a plurality of signals, instructions, and/or information between the slave machine 102 and various other machines of the system 100. The communication device 132 may also be configured to permit wireless transmission of a plurality of signals, instructions, and/or information between the slave machine 102 and one or more servers, processors, computers, and/or other controllers 134, one or more tablets, computers, cellular/wireless telephones, personal digital assistants, mobile devices, or other electronic devices 136, and/or other components of a control system 130. Such a control system 130 may be located at the worksite. Alternatively, one or more components of the control system 130 may be located remote from the worksite (e.g., at a remote command center). It is understood that the control system 130, and its respective components, may be part of and/or otherwise included in the system 100.

For example, a communication device 132 of the slave machine 102 may include a transmitter configured to transmit signals to a receiver of one or more other communication devices associated with additional slave machines and/or master machines utilized at the worksite. In such examples, each communication device 132 may also include a receiver configured to receive such signals. In some examples, the transmitter and the receiver of a particular communication device 132 may be combined as a transceiver or other such component. In any of the examples described herein, such communication devices 132 may enable communications between components of the system 100 via one or more networks 138.

The controller 134 may be an electronic controller that operates in a logical fashion to perform operations, execute control algorithms, store and retrieve data and other desired operations. In any of the examples described herein, the functionality of the controller 134 may be distributed so that certain operations are performed at the worksite and other operations are performed remotely. For example, some operations of the controller 134 may be performed at the worksite, such as by a controller of one or more of the slave machines 102 (e.g., on one or more of the paving machines, haul trucks, cold planers, etc.) and/or other components of the system 100. The controller 134 may include or access memory, secondary storage devices, processors, and any other components for running an application. The memory and secondary storage devices may be in the form of read-only memory (ROM) or random-access memory (RAM) or integrated circuitry that is accessible by the controller 134. Various other circuits may also be associated with the controller 134, such as power supply circuitry, signal conditioning circuitry, driver circuitry, and other types of circuitry.

The controller 134 may be a single processor or other device, or may include more than one controllers or processors configured to control various functions and/or features of the system 100. As used herein, the term "controller" is meant in its broadest sense to include one or more controllers, processors, and/or microprocessors that may be associated with the system 100, and that may cooperate in controlling various functions and operations of the components (e.g., machines) of the system 100. The functionality of the controller 134 may be implemented in hardware and/or software without regard to the functionality. The controller 134 may rely on one or more data maps relating to the operating conditions and the operating environment of the system 100 that may be stored in the memory of the controller 134. Each of these data maps may include a collection of data in the form of tables, graphs, and/or equations to maximize the performance and efficiency of the system 100 and its operation.

The one or more electronic devices 136 described herein may comprise, for example, mobile phones, laptop computers, desktop computers, and/or tablets of project managers (e.g., foremen) overseeing daily paving, mining, construction, excavation, and/or other operations at the worksite. Such electronic devices 136 may include and/or may be configured to access one or more processors, microprocessors, memory, or other components. In such examples, the electronic devices 136 may have components and/or functionality that is similar to and/or the same as the controller 134.

The network 138 may be a local area network ("LAN"), a larger network such as a wide area network ("WAN"), or a collection of networks, such as the Internet. Protocols for network communication, such as TCP/IP, may be used to implement the network 138. Although embodiments are described herein as using a network 138 such as the Internet, other distribution techniques may be implemented that transmit information via memory cards, flash memory, or other portable memory devices. The network 138 may implement or utilize any desired system or protocol including any of a plurality of communications standards. The desired protocols will permit communication between the controller 134, the electronic devices 136, the various communication devices 132 described herein, and/or any other desired machines or components of the system 100. Examples of wireless communications systems or protocols that may be used by the system 100 described herein include a wireless personal area network such as Bluetooth® RTM. (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the components of the system 100 (e.g., between slave machines, and/or between a master machine and one or more slave machines). In other instances, the communications may be automatically routed without the need for re-transmission by remote personnel.

In example embodiments, one or more machines of the system 100 (e.g., the slave machine 102) may also include a location sensor 140 configured to determine a location and/or orientation of the respective machine. In such embodiments, the communication device 132 of the respective machine may be configured to generate and/or transmit signals indicative of such determined locations and/or orientations to, for example, the controller 134, one or more of the electronic devices 136, and/or to the other respective machines of the system 100. In some examples, the location sensors 140 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 140 described herein may comprise a GPS receiver, transmitter, transceiver, laser prisms, and/or other such device, and the location sensor 140 may be in communication with one or more GPS satellites 142 and/or UTS to determine a respective location of the machine to which the location sensor 140 is connected continuously, substantially continuously, or at various time intervals. One or more additional machines of the system 100 may also be in communication with the one or more GPS satellites 142 and/or UTS, and such GPS satellites 140 and/or UTS may also be configured to determine respective locations of such additional machines. In any of the examples described herein, machine locations determined by the respective location sensors 140 may be used by the controller 134, one or more of the electronic devices 136, and/or other components of the system 100 to coordinate activities of the slave machines described herein and/or other components of the system 100. For example, machine locations determined by the respective location sensors 140 may be used by the controller 134, a controller of a master machine disposed at the worksite, and/or other components of the system 100 to determine progress of one or more worksite plans being performed by the slave machines (e.g., an accuracy metric), the probability of contact between a slave machine and an object or human disposed at the worksite (e.g., a safety metric), and/or other parameters. Such control methods will be described in greater detail below.

The slave machine 102 may also include a controller 144 operably connected to and/or otherwise in communication with the communication device 132, and/or other components of the slave machine 102. The controller 144 may be a single controller or multiple controllers working together to perform a variety of tasks. The controller 144 may embody a single or multiple processors, microprocessors, field programmable gate arrays (FPGAs), digital signal processors (DSPs), and/or other components. The controller 144 may be configured to calculate and/or otherwise determine one or more travel paths of the slave machine 102 and/or other operational constraints of the slave machine 102, based at least in part on instructions and/or other information received from the one or more other machines of the system 100 (e.g., the master machine), operating information received from an operator of the slave machine 102, one or more signals received from the GPS satellites 142, and/or other information. For instance, in examples in which the slave machine 102 comprises a semi-autonomous machine or a fully-autonomous machine, the controller 144 may be configured to control the slave machine 102 to travers a slave machine travel path generated by the controller 134 and/or by a controller of a master machine located at the worksite. In such examples, the controller 144 may also be configured to control the slave machine 102 to act on the paving surface 118 and/or other work surface of the worksite in accordance with a worksite plan, instructions corresponding to the worksite plan, and/or other information received from the controller 134 and/or from a controller of a master machine.

Numerous commercially available processors or microprocessors can be configured to perform the functions of the controller 144. Various known circuits may be associated with the controller 144, including power supply circuitry, signal-conditioning circuitry, actuator driver circuitry (i.e., circuitry powering solenoids, motors, or piezo actuators), and communication circuitry. In some embodiments, the controller 144 may be positioned on the slave machine 102, while in other embodiments the controller 144 may be positioned at an off-board location and/or remote location relative to the slave machine 102. The present disclosure, in any manner, is not restricted to the type of controller 144 or the positioning of the controller 144 relative to the slave machine 102. In any of the examples described herein, the location information, boundary information, travel paths, operating information, settings, worksite plans, and/or any other instructions or information received by the controller 144 may be received via the network 138 and/or the communication device 132.

As shown in FIG. 1, the system 100 may further include one or more additional slave machines, and may also include a master machine in communication with each of the slave machines. For instance, the system 100 may also include at least one of a slave machine 146 (illustrated as a cold planer), a slave machine 148 (illustrated as a haul truck), and a master machine 150 (illustrated as a rover or other mobile machine). For the duration of this disclosure, the master machine 150 may be referred to interchangeably as a "mobile machine 150" or an "autonomous mobile machine 150."

The slave machine 146 may include a controller 152 that is substantially similar to and/or the same as the controller 144 described above with respect to the slave machine 102. In such examples, the controller 152 of the slave machine 146 may be in communication with the controller 144 of the slave machine 102 via the network 138. For example, the slave machine 146 may include a communication device 154 configured to send information to the communication device 132 of the slave machine 102 and/or receive information from the communication device 132 of the slave machine 102 via the network 138. The communication device 154 may also be configured to receive instructions and/or other information from a communication device of the master machine 150, and the controller 152 of the slave machine 146 may be configured to control operations of the slave machine 146 based at least partly on such instructions and/or information.

In examples in which the slave machine 146 comprises a cold planer or other such paving machine, the slave machine 146 may include one or more rotors 156 having ground-engaging teeth, bits, or other components configured to remove at least a portion of the roadway, pavement, asphalt, concrete, gravel, dirt, sand, or other materials of a work surface 158 on which the slave machine 146 is disposed. For example, in any of the examples described herein, the slave machine 146 may include a rotor 156 that may be lowered in a substantially downward direction (e.g., in a direction Y') into contact with the work surface 158 by the slave machine 146. In such examples, the rotor 156 of the slave machine 146 may be rotated in a clockwise and/or counterclockwise direction relative to a frame 159 of the slave machine 146 as respective ground-engaging teeth, bits, or other components of the rotor 156 contact the work surface 158 to remove a portion thereof and to reveal the paving surface 118. The slave machine 146 may also include a conveyor system 160 connected to the frame 159, and configured to transport removed portions of the work surface 158 from proximate the rotor 156 to a bed 162 of the slave machine 148 (e.g., to a bed 162 of a haul truck disposed proximate the slave machine 146).

As shown in FIG. 1, the slave machine 146 may further include one or more GPS sensors or other like location sensor 164 configured to determine a location of the slave machine 146 and/or components thereof. In example embodiments, a location sensor 164 connected to the frame 159 of the slave machine 146 may be configured to determine GPS coordinates (e.g., latitude and longitude coordinates), grid coordinates, a map location, and/or other information indicative of the location of the slave machine 146, in conjunction with the one or more GPS satellites 142 described above. Any of the processes described herein with respect to the slave machine 146 may be repeated by the controller 152 of the slave machine 146, the controller 134, the electronic devices 136, and/or other components of the system 100 for each new/updated set of GPS coordinates or other information indicative of the current location of the slave machine 146 as the slave machine 146 traverses a slave machine travel path extending along (e.g., defined by) the work surface 158.

The slave machine 146 may also include an operator station 166, and the operator station 166 may include a console and/or other levers or controls for operating the slave machine 146. In some examples, the operator station 166 may be substantially similar to the operator station 128 described above with respect to the slave machine 102. For example, the console of the operator station 166 may include a control interface for controlling various functions of the slave machine 146. The control interface may comprise an analog, digital, and/or touchscreen display, and such a control interface may be configured to display, for example, at least part of a map of the work surface 158 and/or of the worksite generally, a travel path associated with the slave machine 146, boundaries, centerlines, or other information associated with a portion of the work surface 158 to be acted on by the slave machine 146, a worksite map that identifies the location, size, and/or other parameters of objects disposed on and/or at least partly beneath the area and/or the work surface 158, one or more alerts, warnings, requests, or other information provided to an operator of the slave machine 146 and associated with such objects, and/or other information. The control interface may also support other functions including, for example, sharing various operating data with one or more other machines of the system 100.

With continued reference to FIG. 1, the slave machine 148 (illustrated as an example haul truck) may comprise any on-road or off-road vehicle configured to transport paving material 120, removed portions of the work surface 158, and/or other construction materials to and from a worksite. For instance, similar to the slave machine 146 and the slave machine 102, the slave machine 148 may include a set of wheels or other ground-engaging elements, as well as a power source for driving the ground-engaging elements. The power source may be a conventional internal combustion engine operating on fossil or hybrid fuels, or an electrically operated drive powered by alternate energy sources. As noted above, the slave machine 148 may include a bed 162 configured to receive removed portions of the work surface 158 from the slave machine 146 and/or to transport paving material 120. The slave machine 148 may also include a plurality of hydraulic cylinders or other components configured to controllably raise and lower the bed 162 to facilitate loading or unloading of material carried by the bed 162.

In addition, the slave machine 148 may include a communication device 170 and a location sensor 172. The communication device 170 may be substantially similar to and/or the same as the communication devices 132, 154 described above, and the location sensor 172 may be substantially similar to and/or the same as the location sensors 140, 164 described above. In some examples, the communication device 170 and/or the location sensor 172 may be operably and/or otherwise connected to a controller (not shown) of the slave machine 148. In such examples, the controller of the slave machine 148 may be substantially similar to and/or the same as the controllers 144, 152 described above.

The mobile machine 150 (an example master machine of the system 100) may comprise any on-road or off-road vehicle configured to controllably traverse a portion of the work surface 158 ahead of one or more of the slave machines 102, 146, 148 described herein. For example, the mobile machine 150 may comprise an all-terrain vehicle, rover, or other like machine configured to make multiple passes along the work surface 158 and in accordance with a desired mobile machine travel path. The mobile machine 150 may include a set of wheels, tracks, or other ground-engaging elements 174, as well as a power source for driving the ground-engaging elements 174. The power source may be a conventional internal combustion engine operating on fossil or hybrid fuels, or an electrically operated drive powered by alternate energy sources (e.g., a battery, solar power, etc.). The mobile machine 150 may also include a controller 176, and the controller 176 of the mobile machine 150 may be substantially similar to and/or the same as the controllers 144, 152 described above. In addition, the mobile machine 150 may include a communication device 178 and a location sensor 180. The communication device 178 may be substantially similar to and/or the same as the communication devices 132, 154 described above, and the location sensor 180 may be substantially similar to and/or the same as the location sensors 140, 164 described above. In some examples, the communication device 178 and/or the location sensor 180 may be operably and/or otherwise connected to the controller 176 of the mobile machine 150.

In any of the embodiments described herein, the respective controllers of the slave machine 102, the slave machine 146, the slave machine 148, the mobile machine 150, and/or other components of the system 100 may be operable to control the respective components of the system 100 in a manual mode, a semi-autonomous mode, and/or a fully-autonomous mode of operation. In an example fully-autonomous mode of operation, the controller of the respective component of the system 100 may control, at least in part, steering, speed, acceleration, deceleration, rotor height, rotor speed, screed operation, and/or other functions of the component of the system 100 without input from an operator. In such examples, and as noted above, the mobile machine 150 may comprise an autonomous mobile machine 150. In an example semi-autonomous mode of operation, the controller of the respective component of the system 100 may control one or more such functions, at least in part, without input from the operator, but in such a mode of operation, the operator may be able to assist or override instructions from the controller before or during performance of such functions. In an example manual mode of operation, the operator may manually control performance of such functions, but the controller of the respective component of the system 100 may be called upon to periodically and/or temporarily control the performance of such functions (e.g., controlling speed of a component of the system 100 on "cruise control").

As shown in FIG. 1, the mobile machine 150 may also include at least one sensor 182 configured to determine sensor information associated with the work surface 158. In such examples, the sensor 182 may comprise a single sensor, multiple sensors, or an array of sensors, and each respective at least one sensor 182 may be configured to sense, capture, detect, and/or otherwise determine respective sensor information associated with the work surface 158. In some examples, the sensor 182 may comprise one or more digital cameras, video cameras, thermal sensors, infrared sensors, or other image capture devices. In an example embodiment, the sensor 182 may comprise an array of image capture devices configured to sense, capture, detect, and/or otherwise determine sensor information comprising one or more visual images, thermal images, infrared images, and/or other images of the work surface 158 as the mobile machine 150 traverses a mobile machine travel path extending along the work surface 158. Such visual images may comprise, for example, still images, moving images (e.g., video), thermal images, infrared images, and/or other images. In such examples, the controller 176 may be configured to receive sensor information determined by the sensor 182, and to identify and/or classify one or more objects included in such images. In such examples, the controller 176 may employ one or more object recognition algorithms or other programs to assist in identifying and/or classifying such objects. Additionally or alternatively, the sensor 182 may comprise one or more magnetic sensors (e.g., a magnetometer) configured to emit and/or otherwise direct an electromagnetic field toward the work surface 158, and to determine a disturbance in the emitted electromagnetic field caused by an object disposed beneath the area and/or below the work surface 158. Such a magnetic sensor may be configured to determine the presence of such an object, and/or to determine a distance between the work surface 158 and a surface (e.g., a side surface, a top surface, etc.) of such an object.

Further, in some examples the sensor 182 may comprise one or more light detection and ranging (hereinafter "LIDAR") sensors, radio detection and ranging (hereinafter "RADAR") sensors, sound detection and ranging (hereinafter "SONAR") sensors, and/or other such sensors. For example, in some embodiments the sensor 182 may comprise at least one ground-penetrating RADAR (GPR) sensors carried by the mobile machine 150. An example GPR sensor and other object detection devices are described in co-owned U.S. patent application Ser. No. 14/641,989 (published on Sep. 15, 2016 as U.S. Patent Application Publication No. 2016/0265174), the entire disclosure of which is incorporated herein by reference. In some examples, such a GPR sensor may include a transmitter configured to emit electromagnetic waves in the radio or microwave domain. Such a GPR sensor may also include a receiving antenna and/or other receiving device configured to receive electromagnetic waves reflected by an object, and a processor configured to determine one or more properties of the object. In such examples, the GPR may be configured to determine a distance from the GPR to a surface (e.g., at least an uppermost surface) of an object reflecting the electromagnetic waves emitted by the GPR. In such examples, the GPR may be configured to determine a distance in the direction Y' from, for example, the sensor 182 and/or from the work surface 158 to at least an uppermost surface of an object disposed beneath the area and/or below the work surface 158.

In any of the examples described herein, the controller 176 of the mobile machine 150, the controller 134, the electronic device 136, and/or any of the other controllers described herein may be configured to determine a mobile machine travel path, a slave machine travel path, a worksite map, one or more worksite plans, and/or other operating parameters of one or more components of the system 100 through extrapolation, using one or more trigonometric algorithms, using one or more neural networks and/or machine learning algorithms, using fuzzy logic, using one or more look-up tables, and/or through one or more additional methods. In an example embodiment, the controller 176 of the mobile machine 150, the controller 134, the electronic device 136, and/or any of the other controllers described herein may have an associated memory in which various extrapolation models, trigonometric algorithms, machine learning algorithms, look-up tables, and/or other components may be stored for determining such operating parameters based at least partly on one or more inputs. Such inputs may include, for example, a worksite plan and/or other information indicative of operations to be performed by one or more of the slave machines 102, 146, 148 at the worksite.

For example, as will be described below, the controller 176 of the mobile machine 150 may receive such a worksite plan (e.g., a first worksite plan) from an operator, a foreman, and/or other sources. In some examples, such a first worksite plan may be provided to the controller 176 by the controller 134 and/or by the electronic device 136, via the network 138. The controller 176 may determine a slave machine travel path and/or a mobile machine travel path based at least partly on such information. For example, the controller 176 may determine a mobile machine travel path extending along the work surface 158 based at least partly on a first worksite plan received from the controller 134. The controller 174 may cause the mobile machine 150 to traverse the mobile machine travel path, and may receive first sensor information associated with the work surface 158. Such sensor information may be determined by the at least one sensor 182 as the mobile machine 150 traverses the mobile machine travel path. In such examples, the controller 176 may also receive location information from the location sensor 180 as the mobile machine 150 traverses the mobile machine travel path, and such location information may correspond to the sensor information received from the at least one sensor 182.

In such examples, the controller 176 may generate a worksite map based at least partly on the sensor information and/or the location information, and the worksite map may identify one or more objects disposed on or at least partly beneath the work surface 158. The controller 176 may also generate a second (e.g., a more detailed) worksite plan based at least partly on the first sensor information and/or the location information described above. The controller 176 may provide instructions to one or more of the slave machines 102, 146, 148 described herein such that the one or more slave machines 102, 146, 148 may perform at least part of the second worksite plan. For instance, the second worksite plan may include a slave machine travel path, and the instructions provided to the slave machine 146 may include the slave machine travel path. In such examples, the controller 152 of the slave machine 146 may cause the slave machine 146 to traverse the work surface 158 along the slave machine travel path included in the instructions, and to perform one or more operations as the slave machine 146 traverses the slave machine travel path.

The controller 176 may receive second sensor information determined by the sensor 182 as the slave machine 146 performs at least part of the second worksite plan, and such second sensor information may be indicative of the slave machine 146 performing at least part of the second worksite plan. The controller 176 may generate at least one of a safety metric and an accuracy metric based at least partly on the second sensor information received during this process, and in some examples, the controller 176 may modify the operation of the slave machine 146 to avoid damage, contact with and/or harm to one or more objects disposed proximate the slave machine 146, etc. The controller 176 may also modify the operation of the slave machine 146 to ensure accurate and efficient performance of the second worksite plan by the slave machine 146. In this way, slave machine downtime may be reduced, worksite safety may be improved, and system efficiency may be increased. Further, because the sensor 182 is disposed on the autonomous mobile machine 150, and not the slave machine (e.g., the slave machine 146), the sensor 182 may accurately and effectively monitor the location of the slave machine 146, the performance of the second worksite plan by the slave machine 146, and/or the presence or location of objects located on the work surface 158, without the respective field of view of the sensor 182 being obstructed by the conveyor system 160, the frame 159, the operator station, and/or other components of the slave machine 146.

Figure 2:
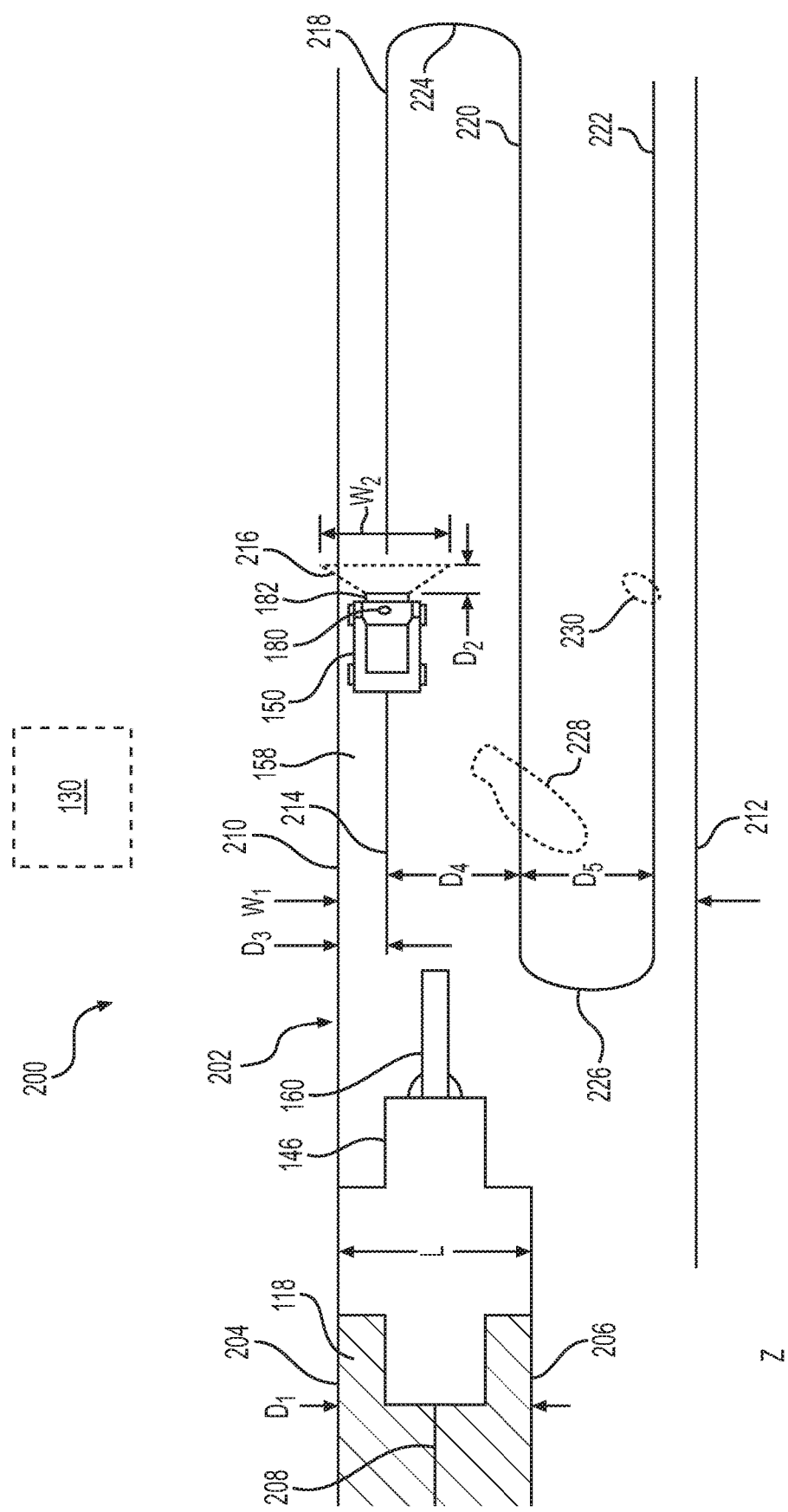
FIG. 2 is a schematic illustration of a slave machine (e.g., a cold planer) and a master machine (e.g., a mobile machine) traversing a work surface, in accordance with an example embodiment of the present disclosure.

FIG. 2 illustrates an example worksite 200 including an area 202 (e.g., a cut area) of the work surface 158 to be modified, cut, dug, cleared, removed, graded, and/or otherwise acted upon by the slave machine 146 based at least partly on a worksite plan. In an example embodiment, the area 202 (e.g., a cut area) may be formed by the slave machine 146 on the work surface 158 to reveal the paving surface 118 described above, and an example slave machine 102 (FIG. 1) may be operated to deposit paving material 120 (e.g., a mat 126) on the paving surface 118 and within the area 202. FIG. 2 also illustrates the example slave machine 146 traversing at least a portion of an example slave machine travel path, and an example mobile machine 150 traversing at least a portion of a mobile machine travel path. As noted above, any of the operations described herein may be performed by the slave machine 146 and/or by the mobile machine 150 in an autonomous operating mode, in a semi-autonomous operating mode, and/or in a manual operating mode.

As shown in FIG. 2, the slave machine 146 may have a width L in the direction Z. In such examples, the width L may comprise and/or may be substantially equal to an axial length of the rotor 156 (FIG. 1), and the width L may define the width $D_1$ of the portion of the work surface 158 removed by the slave machine 146 as the slave machine 146 traverses the work surface 158. For example, the rotor 156 of the slave machine 146 may remove a top layer and/or any other portion of the work surface 158, and the removed portion of the work surface 158 may include a first boundary 204 (e.g., a right-hand side boundary) and a second boundary 206 (e.g., a left-hand side boundary) disposed opposite and substantially parallel to the first boundary 204. In such examples, a slave machine travel path 208 extending along the work surface 158 and/or otherwise associated with the area 202 may extend substantially centrally (e.g., longitudinally) through the removed portion of the work surface 158 (e.g., substantially centrally between the first boundary 204 and the second boundary 206).

In any of the examples described herein, the slave machine travel path 208 may comprise a line, an arc, a curve, a travel envelope, and/or other path traversed by the slave machine 146 along the work surface 158 when forming the area 202, and in accordance with one or more worksite plans. In such examples, the area 202 may have a substantially vertical depth (e.g., a depth in the direction Y' shown in FIG. 1) between approximately 2 inches and approximately 4 inches. In further examples, the depth of the area 202 may be greater than approximately 4 inches or less than approximately 2 inches depending on the requirements of the paving operation being performed on the work surface 158. It is understood that any of the depths, dimensions, or other configurations of the area 202 described herein are merely examples, and such configurations should not be interpreted as limiting the present disclosure in any way.

As shown in FIG. 2, an example area 202 to be formed by the slave machine 146 in accordance with one or more worksite plans may include a first boundary 210 (e.g., a right-hand side boundary) and a second boundary 212 (e.g., a left-hand side boundary) disposed opposite and substantially parallel to the first boundary 210. Additionally, a width $W_1$ of the area 202 may extend in the direction Z' from the first boundary 210 to the second boundary 212, and the width $W_1$ may be substantially equal to a maximum cutting span of the slave machine 146. In additional examples, on the other hand, an example area 202 of the present disclosure may include one or more widths, shapes, features, contours, and/or other configurations formed by slave machine 146 as the slave machine 146 is controlled to traverse the work surface 158 in more than one pass and/or according to one or more additional (e.g., non-linear) travel paths.

In example embodiments, the controller 176 of the mobile machine 150, the controller 134, the electronic device 136, and/or any other controllers described herein may receive information indicative of a first worksite plan (e.g., information outlining one or more operations to be performed at the worksite 200 by a slave machine 146), and may determine, among other things, a mobile machine travel path 214 extending along the work surface 158 based at least partly on such information. In such examples, the mobile machine travel path 214 may a line, an arc, a curve, a travel envelope, and/or other path traversed by the mobile machine 150 along the work surface 158.

Such a worksite plan (e.g., a first worksite plan) may include, among other things, a first plurality of sequential GPS coordinates indicative of the location and/or extent of the first boundary 210, a second plurality of sequential GPS coordinates indicative of the location and/or extent of the second boundary 212, the desired depth in the direction Y' (substantially constant and/or variable) of the area 202, a desired density of the paving material mat 126 to be formed on the paving surface 118, and/or other information. Such information may be entered, programmed, and/or otherwise received from an electronic device 136 used by a foreman of the worksite 200, a remote control center operator having access to the controller 134, an operator of the mobile machine 150, or other operators associated with the worksite 200. In some examples, the first worksite plan may include a third plurality of sequential GPS coordinates indicative of the location and/or extent of the slave machine travel path 208. Alternatively, in further examples the controller 176 of the mobile machine 150 and/or other controllers described herein may calculate, estimate, and/or otherwise determine the slave machine travel path 208 based on the width L of the slave machine 146 and/or of the rotor 156, as well as the location of the first boundary 210 and the second boundary 212. For example, in some embodiments the width L of the slave machine 146 may be substantially equal to the desired width $W_1$ of the area 202 specified in the worksite plan. Accordingly, in such examples the determined slave machine travel path 208 may extend substantially centrally between the first boundary 210 and the second boundary 212. Alternatively, the width L of the slave machine 146 may be less than the desired width $W_1$ of the area 202 specified in the first worksite plan. In such examples, the controller 176 of the mobile machine 150 may determine a first slave machine travel path spaced a first distance from the first boundary 210, and a second slave machine travel path spaced a second distance from the second boundary 212. In such examples, the slave machine 146 may be controlled (e.g., by the controller 152) to traverse the first slave machine travel path during a first pass along the work surface 158, and may be controlled (e.g., by the controller 152) to traverse the second slave machine travel path during a second pass along the work surface 158, in order to form the area 202 having such a desired width $W_1$.

In any of the examples described herein, the controller 134, the controller 176 of the mobile machine 150, and/or other controllers of the system 100 may also determine the mobile machine travel path 214 based at least partly on the first worksite plan and/or other information described above. For example, in some embodiments the first worksite plan may include a first plurality of sequential GPS coordinates indicative of the location and/or extent of the first boundary 210, and a second plurality of sequential GPS coordinates indicative of the location and/or extent of the second boundary 212. In such examples, the controller 176 may determine a mobile machine travel path 214 configured such that the at least one sensor 182 of the mobile machine 150 may sense, detect, collect, and/or otherwise determine sensor information associated with the area 202 of the work surface 158 to be acted on by the slave machine 146. For example, the controller 176 may determine a mobile machine travel path 214 that is configured such that the at least one sensor 182 of the mobile machine 150 may sense, detect, collect, and/or otherwise determine sensor information associated with the entire width $W_1$, and the entire extent (e.g., the entire length) of the area 202 in the direction X.

In some examples, the controller 176 may determine the mobile machine travel path 214 based at least partly on the shape, length, width, depth, extent, angle, and/or other configurations of a field of view 216 of the sensor 182. It is understood that the sensor 182 may have a substantially conical, substantially cube-shaped, and/or any other type (e.g., shape) of field of view. As shown in FIG. 2, in some examples the field of view 216 may have a width $W_2$ in the direction Z and/or in the direction Z'. Additionally or alternatively, the field of view 216 may have a length extending a distance $D_2$ from the sensor 182 in the direction X. Further, in some examples (e.g., examples in which the sensor 182 comprises a GPR) the field of view 216 may have a depth extending in the direction Y' (and/or a height extending in the direction Y) to facilitate sensing, detecting, and/or identifying one or more objects disposed on and/or at least partly beneath the work surface 158 and/or the area 202 to be formed by the slave machine 146. In any of the examples herein, the width $W_2$, the length (extending a distance $D_2$ in the direction X), and/or other characteristics of the field of view 216 may be configured such that, depending on the orientation and/or position of the mobile machine 150, at least part of the slave machine 146 may be disposed within the field of view 216 as the slave machine 146 is controlled to perform at least part of an example worksite plan of the present disclosure.

In any of the examples described herein, the controller 176 may determine the mobile machine travel path 214 based at least partly on the width $W_2$ (in the direction Z and/or in the direction Z') of the field of view 216 and/or the width $W_1$ of the area 202 to be formed by the slave machine 146. For example, the controller 176 may determine a mobile machine travel path 214 comprising a single pass in embodiments in which the width $W_2$ of the field of view 216 is greater than or equal to the width $W_1$ of the area 202 to be formed by the slave machine 146. In such examples, the sensor 182 may be configured to determine sensor information associated with the entire work surface 158 in a single pass. Alternatively, in examples in which the width $W_2$ of the field of view 216 is less than the width $W_1$ of the area 202 to be formed by the slave machine 146, the controller 152 may determine a mobile machine travel path 214 comprising two or more passes such that the entire work surface 158 associated with the area 202 to be formed by the slave machine 146 may be scanned and/or otherwise sensed by the sensor 182. Such an example mobile machine travel path 214 is illustrated in FIG. 2.

For instance, an example mobile machine travel path 214 may include a first pass 218 spaced from the first boundary 210 by a distance $D_3$, a second pass 220 adjacent to the first pass 218 and spaced from the first pass 218 by a distance $D_4$, and a third pass 222 adjacent to the second pass 218 and spaced from the second pass 220 by a distance $D_5$. Such an example mobile machine travel path 214 also includes a first turn 224 connecting the first pass 218 with the second pass 220, and a second turn 226 connecting the second pass 220 with the third pass 222. In further example embodiments, the mobile machine travel path 214 may include greater than or less than three passes depending on the width $W_2$ of the field of view 216 and/or the width $W_1$ of the area 202 to be formed by the slave machine 146. Further, in some examples the width $W_2$ of the field of view 216 may be less than approximately 30 inches, and the depth (e.g., extending from the sensor 182 in the direction Y' shown in FIG. 1) may be greater than approximately 18 inches. In additional examples, on the other hand, the width $W_2$ of the field of view 216 may be greater than or equal to approximately 30 inches, and the depth (e.g., extending from the sensor 182 in the direction Y' shown in FIG. 1) may be less than or equal to approximately 18 inches. The field of view 216 may also have a length, in the direction X, extending any distance $D_2$ greater than or equal to approximately 6 inches. For instance, in some examples, the distance $D_2$ may be greater than or equal to 10 feet, 20 feet, 50 feet, 100 feet, or other distances, and the width $W_2$, depth, and/or other configurations of the field of view 216 may have commensurate dimensions. Such dimensions of the field of view 216 may be large enough to enable the sensor 182 to determine and/or monitor the position of the slave machine 146 and/or its components, while the mobile machine 150 remains substantially stationary, as the slave machine 146 traverses the entire slave machine travel path 208 at the worksite 200. It is understood that any of the dimensions and/or other configurations of the field of view 216 described above are merely examples, and such dimensions and/or other configurations are not intended to limit the present disclosure in any way. Additionally, while the first turn 224 and the second turn 226 are represented as "U-turns," in further examples, the mobile machine 150 may be configured to make "K-turns" or "S-turns" in order to travel along adjacent passes of the mobile machine travel path 214. For example, the mobile machine 150 may be configured to traverse the first pass 218 in the direction X, and to perform an S-turn at the end of the first pass 218 by directionally shifting across the work surface 158 in substantially the direction Z' (e.g., without turning around). In such an example, the mobile machine 150 may traverse the second pass 220, in reverse, in the direction X'.

Configuring the mobile machine travel path 214 in this way may assist in enabling the sensor 182 to sense, detect, identify, and/or otherwise determine the presence of one or more objects disposed on and/or at least partly beneath the work surface 158. For example, the mobile machine travel path 214 may be positioned, shaped, and/or otherwise configured such that the field of view 216 overlays and/or extends beyond the first boundary 210 and/or the second boundary 212. In some examples, the field of view 216 may overlay and/or extend beyond the first boundary 210 of the area 202 when the mobile machine 150 traverses the first pass 218 of the mobile machine travel path 214. Additionally, the field of view 216 may overlay and/or extend beyond the second boundary 212 of the area 202 when the mobile machine 150 traverses the second pass 220, the third pass 222, or an additional pass (not shown) of the mobile machine travel path 214. In any such examples, the sensor 182 may determine sensor information indicative of the presence, location, identity, material composition, shape, size, and/or other configurations or characteristics of an object disposed on and/or at least partly beneath the work surface 158.

FIG. 2 illustrates a first object 228 and a second object 230. It is understood that in further examples, greater than or less than two objects may be identified by the sensor 182. Also, while some objects (e.g., the first object 228 and the second object 230) may be disposed substantially within the area 202 (e.g., substantially between the first boundary 210 and the second boundary 212), in some examples, at least one object may be disposed at least partly outside of the area 202. At least one of the first object 228 and the second object 230 may comprise a manhole cover, a sewer grate, a rock, a pipe cap, an underground pipe, drainage line, electrical cable, water line, piece of rebar, I-beam, metal stud, or other structure. In any of the examples described herein, contact between, for example, the rotor 156 and the first object 228 or the second object 230 may cause damage to the rotor 156. Accordingly, the mobile machine 150 and/or other components of the system 100 may be configured to assist the slave machine 146 in avoiding such contact as the slave machine 146 forms the area 202 and/or performs at least part of a worksite plan. In other examples, at least one of the first object 228 or the second object 230 may comprise a foreman, an operator, and/or any other such person present at the worksite 200. In such examples, the mobile machine 150 and/or other components of the system 100 may be configured to assist the slave machine 146 in avoiding contact with such persons, in order to avoid bodily harm or injury.

Figure 3:
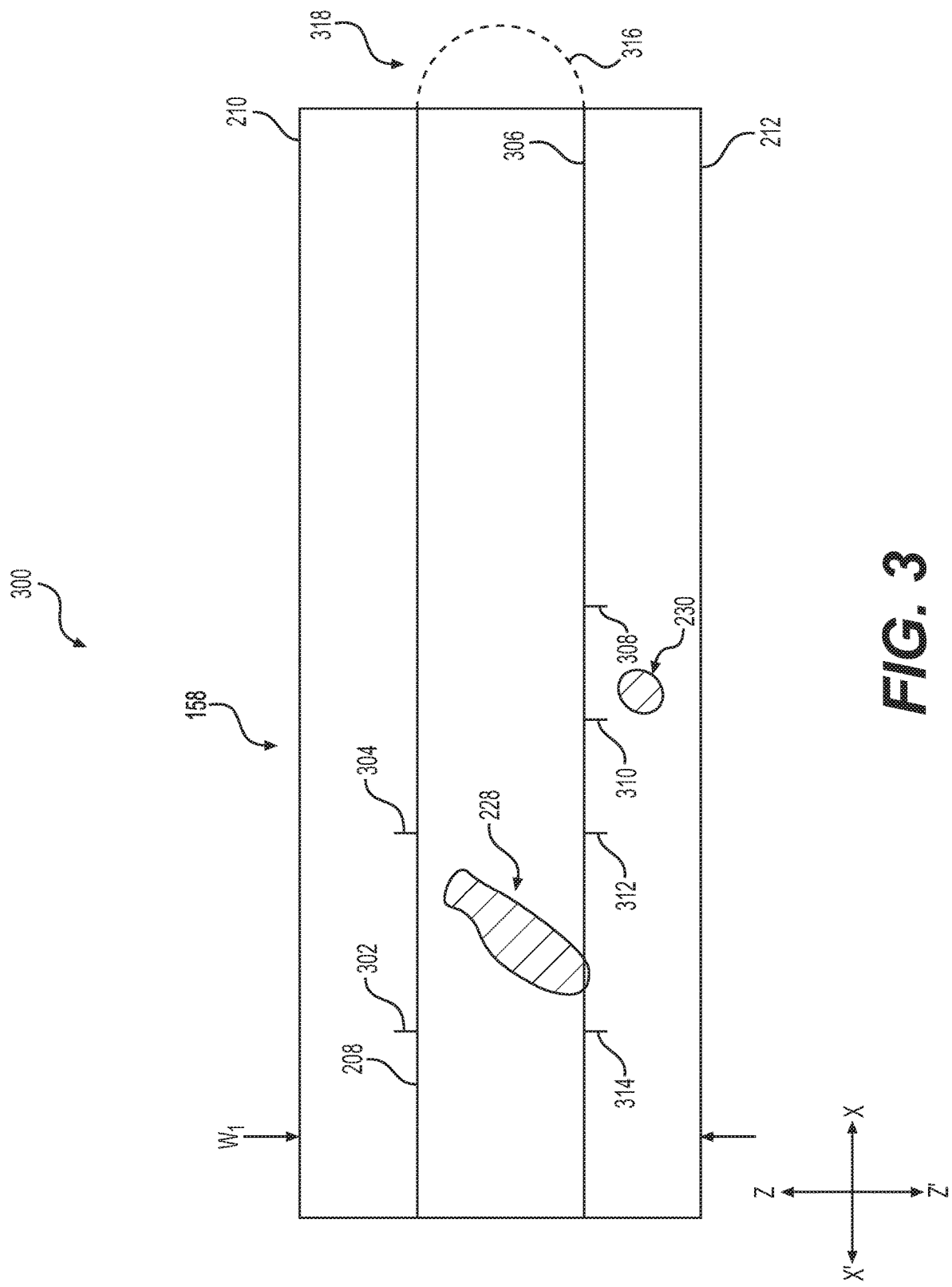
FIG. 3 is a schematic illustration of an example worksite map of the present disclosure.

FIG. 3 illustrates a visualization of an example worksite map 300 of the present disclosure. The visualization of the example worksite map 300 shown in FIG. 3 corresponds to the worksite 200 shown in FIG. 2. It is understood that an example worksite map 300 of the present disclosure may comprise one or more text files, data files, video files, digital image files, and/or other electronic files providing information indicative of the area 202 to be formed by the slave machine 146, the work surface 158 on which the area 202 will be formed, the slave machine travel path 208, the mobile machine travel path 214, one or more objects disposed on and/or at least partly beneath the work surface 158, and/or other aspects of a particular worksite 200. For example, the worksite map 300 may include location information comprising a first plurality of GPS coordinates indicating a location and/or extent of the first boundary 210 of the area 202, and a second plurality of GPS coordinates, indicating a location and/or extent of the second boundary 212 of the area 202. The worksite map 300 may also include a plurality of GPS coordinates indicating respective locations of one or more objects (e.g., the first object 228, the second object 230, etc.) disposed on and/or at least partly beneath the work surface 158, and/or other information indicating respective locations, distances, etc. For example, the worksite map 300 may include a plurality of GPS coordinates indicating respective locations of substantially all points along one or more surfaces of such objects. Such GPS coordinates may assist the controller 176 of the mobile machine 150 in determining the slave machine travel path 208 and/or in determining aspects of one or more worksite plans to be performed by the slave machine 146.

In still further examples, the worksite map 300 may include location information indicative of the slave machine travel path 208 and/or of the mobile machine travel path 214. For example, the worksite map 300 may include a plurality of GPS coordinates indicating a location and/or extent of the slave machine travel path 208 extending along the work surface 158. In some examples, the worksite map 300 may also indicate various locations along the slave machine travel path 208 at which action should be taken by the slave machine 146 to avoid contact with one or more of the identified objects (e.g., the first object 228, the second object 230, etc.). In some examples, such action may include changing (e.g., raising) a position of the rotor 156 relative to the frame 159 of the slave machine 146. For example, the worksite map 300 may include first GPS coordinates indicating a first location 302 along the slave machine travel path 208 at which the rotor 156 should be raised, in a direction away from the work surface 158, in order to avoid contact with an object (e.g., the first object 228) disposed on and/or at least partly beneath the work surface 158. In such examples, the worksite map 300 may also include second GPS coordinates indicating a second location 304 along the slave machine travel path 208 at which an additional action should be taken by the slave machine 146 once the slave machine 146 has moved past the identified object. Such an additional action may include, for example, lowering the rotor 156, in a direction toward the work surface 158, after the rotor 156 and/or the slave machine 146 has moved past such an object (e.g., the first object 228).

As shown in FIG. 3, an example visualization of the worksite map 300 may comprise a still image, a video image (e.g., a real-time video image), a graphical representation, a graphical user interface (GUI), and/or other visual representation of the worksite map 300 and its components. Such a visualization of the worksite map 300 may be presented to an operator of the slave machine 146 via a display or other component of the console, to a foreman via a display or other component of the electronic device 136, to an operator via one or more displays operably connected to the controller 134, and/or to any other individuals via one or more displays or other devices described herein. Such a visualization may include, for example, one or more two-dimensional images (as shown in FIG. 3) and/or one or more three-dimensional images illustrative of information included in the worksite map 300. Further, such a visualization of the worksite map 300 may include visual indicia indicative of one or more of the items described above. For instance, an example visualization of the worksite map 300 may include one or more lines, patterns, markings, images, icons, and/or other visual indicia of the slave machine travel path 208, the work surface 158, the area 202 to be formed by the slave machine 146, and/or of one or more objects (e.g., first object 228, second object 230, etc.) disposed on and/or at least partly beneath the work surface 158. Although not illustrated in FIG. 3, in some examples, a visualization of the worksite map 300 may also include an image, icon, and/or other visual indicia representing the slave machine 146, the mobile machine 150, and/or any other component of the paving system 100 located at the worksite 200. In the example embodiment of FIG. 3, a visualization of the worksite map 300 may further include one or more hashmarks, lines, arrows, markings, images, icons, and/or other visual indicia indicating the first location 302 and/or the second location 304 along the slave machine travel path 208 at which various actions should be taken by the slave machine 146 while performing at least part of a worksite plan in accordance with instructions received from the mobile machine 150.

The example visualization of the worksite map 300 shown in FIG. 3 illustrates a slave machine travel path 208 including a first pass with which the first location 302 and the second location 304 are associated. In such examples, the slave machine travel path 208 may also include a second pass 306 in which the slave machine 146 may traverse the work surface 158 in the direction X'. Accordingly, the example visualization of the worksite map 300 may include one or more lines, patterns, markings, images, icons, and/or other visual indicia of the second pass 306. In the example embodiment of FIG. 3, a visualization of the worksite map 300 may further include one or more hashmarks, lines, arrows, markings, images, icons, and/or other visual indicia indicating a third location 308, along the second pass 306, similar to the first location 302 described above. Such a visualization of the worksite map 300 may further include a fourth location 310, along the second pass 306, similar to the second location 304 described above. Taking action at the third location 308 may assist the slave machine 146 in avoiding contact with the second object 230 illustrated in FIG. 3. Similarly, a visualization of the worksite map 300 may also include one or more hashmarks, lines, arrows, markings, images, icons, and/or other visual indicia indicating a fifth location 312 along the second pass 306, similar to the first location 302 described above. The visualization may further include one or more hashmarks, lines, arrows, markings, images, icons, and/or other visual indicia indicating a sixth location 314 along the second pass 306, similar to the second location 304 described above.

In any of the examples described herein, the worksite map 300, and/or a visualization thereof, may also include location information indicative of one or more turns 316 and/or other components of the slave machine travel path 208. For example, the worksite map 300 may include a plurality of GPS coordinates (e.g., sequential GPS coordinates), UTS coordinates, and/or other location information indicating substantially all points along the slave machine travel path 208. Such GPS coordinates may indicate, for example, a turn 316 extending from a first pass of the slave machine travel path 208 to the second pass 306. Such a turn 316 may be similar to one or more of the turns 224, 226 described above with respect to the mobile machine travel path 214 (FIG. 2).

In some examples, the worksite map 300 may also indicate various locations and/or other areas 318 associated with the work surface 158, and/or with the slave machine travel path 208, at which substantially no action should be taken by one or more components of the slave machine 146 to act on the work surface 158. For instance, one or more such areas 318 may be defined by the work surface 158, and such areas 318 may comprise turn areas, maneuver areas, or other portions of the work surface 158 along which the slave machine 146 may traverse while traveling from a first pass of the slave machine travel path 208 to the second pass 306. In such examples, the one or more turns 316 of the slave machine travel path 208 may be defined by the area 318 of the work surface 158. In example embodiments, the slave machine 146 may be controlled such that the rotor 156, conveyor system 160, bucket, shovel, tool, and/or other implement or component of the slave machine 146 remain disengaged, de-energized, substantially stationary relative to the frame 159, and/or take substantially no action while the slave machine 146 is located within the area 318. In such examples, the implements and/or other components of the slave machine 146 slave machine 146 may not dig, cut, modify and/or otherwise act on the work surface 158 while the slave machine 146 traverses the various portions of the slave machine travel path 208 (e.g., the turn 316) defined by the area 318 of the work surface 158.

While the visualization of the worksite map 300 has been described herein as including various visual indicia associated with, for example, the first object 228, the second object 230, a first location 302, a second location 304, and/or other items, in further examples, a worksite map and/or a visualization thereof, may include greater than, less than, and/or different visual indicia than those described above with respect to the worksite map 300. The information included in such worksite maps and/or the visual indicia included in the example visualizations of such worksite maps, may correspond to the shape, size, dimensions, and/or other configurations of the area 202 and/or the work surface 158, as well as the shape, size, orientation, quantity, and/or configuration of one or more objects disposed on and/or at least partly beneath the work surface 158.

In any of the examples described herein, one or more visualizations of the worksite map 300 may be output, displayed, and/or otherwise provided via a console of the slave machine 146, via the electronic device 136, and/or via any additional display or corresponding device of the system 100. Providing example visualizations of the worksite map 300 described above may assist an operator in controlling the slave machine 146, and may also assist the slave machine 146, and/or an operator thereof, in avoiding contact between various components of the slave machine 146 (e.g., the rotor 156, the conveyor, one or more implements, etc.) and one or more of the objects described above. As a result, the worksite map 300 described herein with respect to FIG. 3 may assist in reducing damage to the slave machine 146, thereby minimizing downtime of the slave machine 146 and extending the useful life thereof. As an additional result, damage and/or harm (e.g., bodily harm) to the objects described herein may also be avoided.

Figure 4:
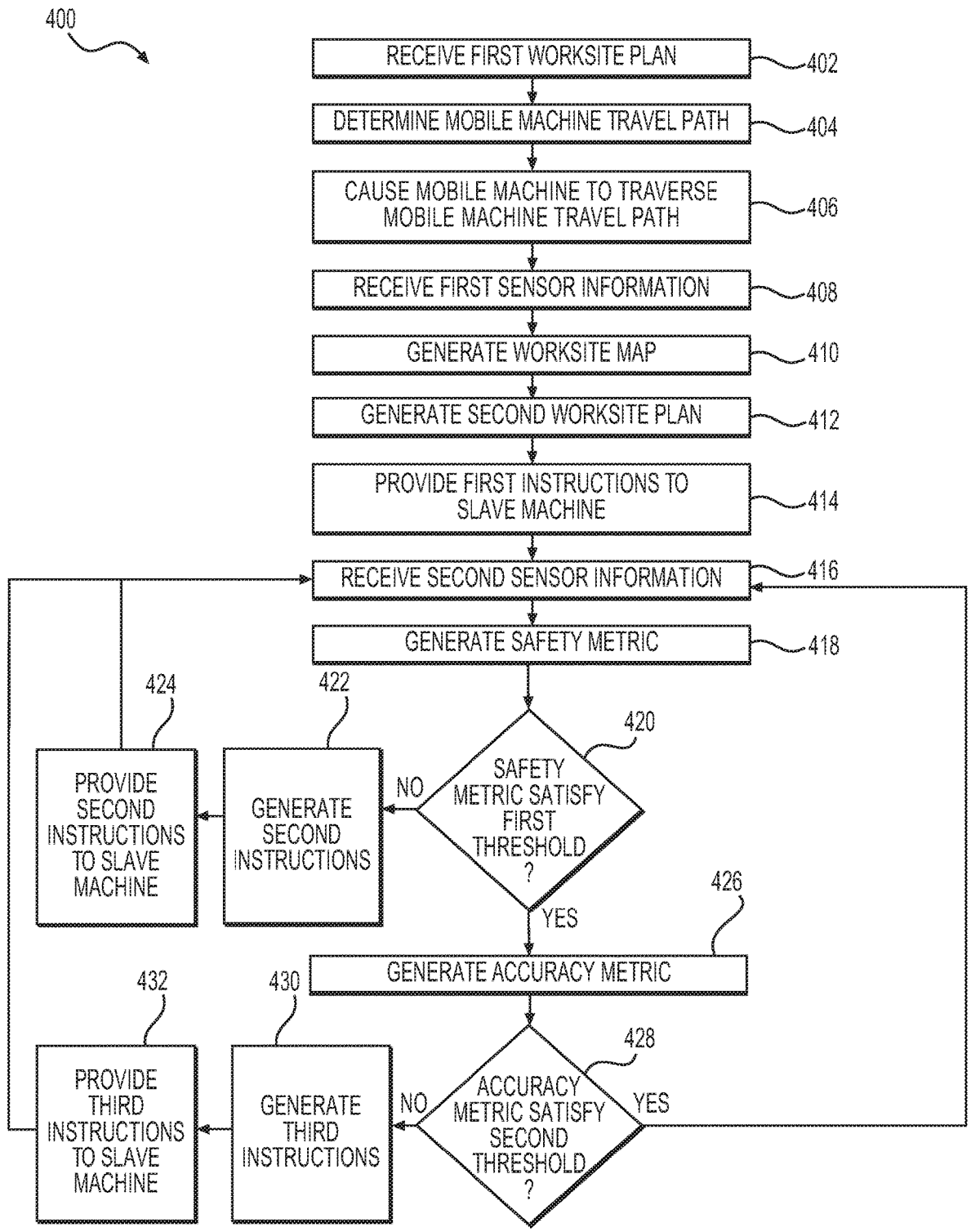
FIG. 4 is a flow chart depicting a method in accordance with an example embodiment of the present disclosure.

FIG. 4 illustrates a flow chart depicting a method 400 in accordance with an example embodiment of the present disclosure. The example method 400 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 176 of the mobile machine 150, the controller 134, the electronic device 136, and/or other components of the system 100, such instructions may cause the controller 176, the mobile machine 150, the slave machine 146, and/or various components of the system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 400 is described with reference to the system 100, the slave machine 146, the mobile machine 150, and/or the slave machine 102 of FIG. 1. In particular, unless otherwise noted, the method 400 will be described below with respect to the controller 176. As noted above, in further example embodiments, any of the operations of the method 400 may be performed by the controller 144, the controller 152, the controller 134, the electronic device 136, and/or by other components of the system 100, either alone or in combination.

At 402, the controller 176 of the mobile machine 150 may receive various information from one or more sources associated with the system 100. For example, at 402 the controller 176 may receive information indicative of a worksite plan corresponding to the worksite 200 and/or the work surface 158 of the worksite 200. Such a worksite plan may include, among other things, a first plurality of sequential GPS coordinates (e.g., latitude and longitude coordinates), UTS coordinates, and/or other information indicative of the location and/or extent of the first boundary 210 of the area 202, a second plurality of sequential GPS coordinates (e.g., latitude and longitude coordinates), UTS coordinates, and/or other information indicative of the location and/or extent of the second boundary 212 of the area 202, a desired depth in the direction Y' (substantially constant and/or variable) of the area 202, a desired density of a paving material mat 126 to be formed on the paving surface 118, and/or other information. In some examples the information received at 402 may include GPS coordinates, UTS coordinates, and/or other information indicating the extent of the perimeter of the work surface 158 (e.g., including the first boundary 210, the second boundary 212, and/or one or more additional portions of the work surface 158 extending between or from the first boundary 210 to the second boundary 212). Such information may, in some examples, include GPS coordinates, UTS coordinates, and/or other information indicating the location (e.g., the perimeter of) of the area 318 (FIG. 3) defined by the work surface 158. The information indicative of the first worksite plan received at 402 may also include GPS coordinates, UTS coordinates, and/or other information indicating the topography of the work surface 158, and may indicate the location, perimeter, extent, and/or other characteristics of items (e.g., large boulders, valleys, hills, bodies of water, drain lines, utility lines, buildings, paved areas, etc.) known to be present at the worksite 200 and disposed on or proximate the work surface 158. The information indicative of the first worksite plan may also include the types of additional machines (e.g., wheel loader, cold planer, haul truck, compaction machine, etc.) present at the worksite 200, the number of each respective type of machine present at the worksite 200, a unique identifier (e.g., license plate, model number, vehicle identification number, etc.), unique communication link (e.g., a unique control link and/or network communication address associated with the respective controller of each machine), and/or other identification information associated with the respective machines present at the worksite 200, and/or other information associated with the system 100. Further, the information indicative of the first worksite plan may include one or more worksite requirements or desired outcomes. For instance, in an example in which the system 100 is being utilized to remove a layer of gravel, dirt, and/or other material from the work surface 158 in order to prepare the work surface 158 for a paving operation (e.g., depositing a mat 126 of paving material 120 on the paving surface 118 in order to construct a parking lot at the worksite 200), the information received at 402 may specify requirements associated with such an operation. Such example requirements may include an elevation required for the paving surface 118, a grade required (e.g., an acceptable grade range) for the paving surface 118, an amount material to be removed from the work surface 158 (e.g., a cut depth), and/or other like requirements.

At 402, such information may be entered, programmed, and/or otherwise received from an electronic device 136 used by a foreman of the worksite 200, a remote control center operator having access to the controller 134, an operator of the slave machine 146, an operator of the mobile machine 150, or other personnel associated with the worksite 200. In some examples, the worksite plan received at 402 may include a third plurality of sequential GPS coordinates indicative of the location and/or extent of the slave machine travel path 208 extending along the work surface 158 and/or a fourth plurality of sequential GPS coordinates indicative of the location and/or extent of the mobile machine travel path 214 extending along the work surface 158. In further examples, one or more of the slave machine travel path 208 and the mobile machine travel path 214 may be generated and/or otherwise determined by the controller 176 based at least partly on the information received at 402.

At 404, the controller 176 may calculate, estimate, and/or otherwise determine the mobile machine travel path 214 extending along the work surface 158 based at least partly on the worksite plan and/or other information received at 402. For example, as noted above, the information indicative of the first worksite plan received at 402 may include a first plurality of sequential GPS coordinates, UTS coordinates, and/or other information indicative of the location and/or extent of the first boundary 210, and a second plurality of sequential GPS coordinates, UTS coordinates, and/or other information indicative of the location and/or extent of the second boundary 212. The information received at 402 may also include similar coordinate information indicating the location and/or extent of other portions of the perimeter of the area 202 (e.g., portions of the perimeter extending between the first boundary 210 and the second boundary 212). In such examples, at 404 the controller 176 may determine a mobile machine travel path 214 configured such that the at least one sensor 182 of the mobile machine 150 may sense, detect, collect, and/or otherwise determine sensor information associated with the work surface 158 prior to the slave machine 146 traversing various portions of the work surface 158. In such examples, the controller 176 may determine the mobile machine travel path 214 at 404 based at least partly on the shape, length, width, depth, extent, angle, and/or other configurations of a field of view 216 of the sensor 182.

For example, at 404 the controller 176 may determine the mobile machine travel path 214 based at least partly on the width $W_2$, in the direction Z and/or in the direction Z', of the field of view 216. In such examples the controller 176 may determine a mobile machine travel path 214 comprising a single pass in embodiments in which the width $W_2$ of the field of view 216 is greater than or equal to the width $W_1$ of the area 202 to be acted on by the slave machine 146. Alternatively, in examples in which the width $W_2$ of the field of view 216 is less than the width $W_1$ of the area 202, the controller 176 may determine a mobile machine travel path 214 at 404 comprising two or more passes. In such examples, the mobile machine travel path 214 determined at 404 may comprise a number of passes along the work surface 158, and determining the mobile machine travel path 214 at 404 may include determining the number of passes included in the mobile machine travel path 214 based at least partly on the width $W_2$ of the field of view 216 and the width $W_1$ of the area 202 to be acted on by the slave machine 146. In some examples, the controller 176 may determine the number and/or location of the passes included in the mobile machine travel path by dividing the width $W_1$ of the area 202 by the width $W_2$ of the field of view 216.

It is understood that, at 404, the controller 176 may determine the extent, heading, and/or direction of the mobile machine travel path 214, one or more machine travel speeds associated with the mobile machine travel path 214, and/or mobile machine operating parameters associated with traversing the mobile machine travel path 214, in a variety of different ways. For example, in any of the embodiments described herein, a travel path (e.g., the mobile machine travel path 214, the slave machine travel path 208, etc.) may comprise a desired route for a slave machine or master machine to travel in order to maximize the efficiency of the machine as it performs the tasks defined by the corresponding worksite plan. For example, the mobile machine travel path 214 determined at 404 may comprise a most direct route, a best-fit route, a serpentine route, a curved route, and/or other configuration in order to minimize the time and resources required for the mobile machine 150 to travel from its current location to a destination, and such that throughout the course of such travel, the at least one sensor 182 may sense, detect, collect, and/or otherwise determine sensor information associated with the work surface 158 defining the entire area 202.

In any of the examples described herein, one or more of the travel paths (e.g., the mobile machine travel path 214) determined by the controller 176 may comprise a drive line disposed within a drive envelope. In such examples, the drive line may extend approximately centrally through the drive envelope, and the drive envelope may define at least part of the travel path (e.g., the mobile machine travel path 214). For example, the drive envelope defining the mobile machine travel path 214 may be approximately as wide as the mobile machine 150, and in some examples the drive envelope and/or a substantially central drive line of the drive envelope may be used to determine, a trajectory and/or a series of sequential trajectories along which the mobile machine 150 may travel to achieve the desired mobile machine travel path 214. Each trajectory of the series of sequential trajectories may be determined by substantially simultaneously generating a plurality of trajectories and selecting one of the trajectories which is best able to achieve the desired mobile machine travel path 214. In such examples, respective trajectories, and the resulting mobile machine travel path 214 defined thereby, may be generated and/or otherwise determined by the controller 176 in accordance with a receding horizon technique and/or other travel path generation technique. Such a technique and/or other travel path generation techniques may utilize one or more algorithms, neural networks, look-up tables, three-dimensional maps, predictive models, and/or other components to generate at least part of the mobile machine travel path 214 at 404. In some examples, GPS coordinates, UTS coordinates, and/or other location information or coordinates indicating the current location of the mobile machine 150 and the location of the various boundaries of the area 202 may be used by the controller 176 to generate a series of waypoints and/or a series of sequential trajectories corresponding to such waypoints. In such examples, the mobile machine travel path 214 generated at 404 may comprise a sequence of waypoints and/or trajectories leading from the current location of the mobile machine 150 to a desired destination.

In some examples, in generating one or more of the travel paths described herein (e.g., the mobile machine travel path 214, the slave machine travel path 208, etc.), the controller 176 may generate a plurality of sequential trajectories, and each trajectory may comprise a two-dimensional vector or a three-dimensional vector. Such trajectories may be linear trajectories determined using, for example, a linear algorithm (e.g., $Y=mX+b$) or some variation thereof in order to direct the heading of the respective machine. Additionally or alternatively, such trajectories may be curvilinear trajectories, or other trajectories determined using one or more corresponding algorithms. For example, the controller 176 may generate a curvilinear trajectory using one or more best-fit curve algorithms (e.g., a second degree polynomial equation: $Y=aX^2+bX+c$; a third degree polynomial equation: $Y=aX^3+bX^2+cX+d$; etc.) or other techniques. Taken together, the sequential trajectories described above may make up one or more of the travel paths described herein. Further, in some examples the various trajectories determined by the controller 176 may be valid and/or useable by the controller 176 for controlling operation of the mobile machine 150 for a particular time window (e.g. less than 10 seconds) and/or may be recalculated at a certain frequency (e.g. 10 Hz, 30 Hz, etc.).

In any of the examples described herein, determining a travel path (e.g., the mobile machine travel path 214, the slave machine travel path 208, etc.) may also include determining one or more machine speeds corresponding to the determined travel path. For example, the controller 176 may generate travel speeds for the mobile machine 150 at each point and/or for various sequential sections of the mobile machine travel path 214 determined at 404. The controller 176 may determine one or more such travel speeds using predetermined speed limits or other speed requirements associated with the worksite 200. Additionally or alternatively, the controller 176 may utilize previously determined and/or stored machine speeds associated with one or more similar mobile machine travel paths previously traveled by the mobile machine 150 and/or by other mobile machines at the worksite 200. In any of the examples described herein, at 404 the controller 176 may determine one or more machine speeds utilizing the algorithm: Distance=(Rate)×(Time) and/or any other such speed determination techniques.

At 406, the controller 176 may control and/or otherwise cause the mobile machine 150 to traverse at least part of the mobile machine travel path 214 determined at 404. Controlling the mobile machine 150 in this way may cause the mobile machine 150 to travel, from its current location, along the first pass 218 in the direction X. Controlling the mobile machine 150 in this way at 406 may also cause the mobile machine 150 to travel, along the first pass 218, at a first machine speed determined at 404 corresponding to the first pass 218. Additionally, controlling the mobile machine

150 in this way at 406 may cause the mobile machine 150 slow and/or to travel at a second machine speed (e.g., a reduced travel speed determined at 404) as the mobile machine 150 approaches the turn 224. Controlling the mobile machine 150 in this way at 406 may cause the mobile machine 150 to continue traveling at such a second travel speed as the mobile machine 150 traverses the turn 224. At 406, the controller 176 may cause the mobile machine 150 to increase its speed to, for example, the first machine speed as the mobile machine 150 traverses the second pass 220. Such control may continue in this regard at 406 until the mobile machine 150 has traversed the entire and/or substantially the entire mobile machine travel path 214. In some examples, at least part of the one or more turns 224, 226 described herein may be defined by the area 318 of the work surface 158 described above with respect to FIG. 3.

As noted above, the sensor 182, the location sensor 180, and/or other sensors of the mobile machine 150 may continuously, substantially continuously, and/or intermittently sense portions of the work surface 158 as the mobile machine 150 travels along the mobile machine travel path 214. In such examples, the various sensors of the mobile machine 150 may provide signals to the controller 176, including sensor information gathered thereby, such that the controller 176 may identify one or more characteristics of the work surface 158 based at least partly on the received sensor information. For example, at 406 the controller 176 may control the sensor 182, the location sensor 180, and/or other sensors of the mobile machine 150 to observe and/or sense portions of the mobile machine travel path 214 and/or of the work surface 158 that are within the fields of view (e.g., the field of view 216) of the respective sensors as the mobile machine 150 traverses the mobile machine travel path 214. At 406, the sensor 182, the location sensor 180, and/or other sensors of the mobile machine 150 may provide signals to the controller 176 containing sensor information generated by the respective sensors.

At 408, the controller 176 may receive first sensor information associated with the work surface 158. For example, at 408 the controller 176 may receive sensor information collected, sensed, captured, and/or otherwise determined by at least one sensor 182 of the mobile machine 150 as the mobile machine 150 traverses, at least in part, the mobile machine travel path 214. As noted above, in some embodiments the sensor 182 may comprise at least one RADAR sensor, LIDAR sensor, SONAR sensor, image capture device, and/or other sensor carried by the mobile machine 150. In examples in which the at least one sensor 182 comprises a RADAR sensor or a GPR sensor, the at least one sensor 182 may be configured to determine a distance from the sensor 182 to a surface (e.g., an uppermost surface) of an object disposed on and/or at least partly beneath the work surface 158. Such an object may reflect electromagnetic waves emitted by the sensor 182, and the sensor 182 may determine the distance (e.g., in the direction X) to the surface of the object based at least partly on electromagnetic waves reflected by the surface of the object and received by the sensor 182. The sensor 182 may provide any such determined distances and/or other determined information to the controller 176 (e.g., via the network 138) at 408. In some examples, the sensor 182 may determine such distances continuously, substantially continuously, and/or at regular or irregular time intervals (e.g., every 0.5 seconds, every 1 second, every 2 seconds, every 5 seconds, every 10 seconds, every 15 seconds, and/or at any other regular or irregular time interval) as the mobile machine 150 traverses the work surface 158 along the mobile machine travel path 214. Accordingly, the first sensor information received at 408 may comprise a plurality of sequential distances (in the direction X) between the sensor 182 and a surface of various objects disposed on and/or at least partly beneath the work surface 158, as determined by the sensor 182, as the mobile machine 150 traverses the work surface 158 along the mobile machine travel path 214. It is understood that, in examples in which the sensor 182 comprises a LIDAR sensor, SONAR sensor, and/or other sensor, similar distance information may be received from the sensor 182 by the controller 176 at 408.

Additionally or alternatively, in examples in which the sensor 182 comprises one or more (e.g., an array of) digital cameras, video cameras, thermal sensors, or other image capture devices, at 406 the sensor 182 may capture one or more visual images and/or other digital images of the work surface 158 as the mobile machine 150 traverses a mobile machine travel path 214. The sensor 182 may provide any such determined images to the controller 176 (e.g., via the network 138) at 408. Additionally or alternatively, the sensor 182 may comprise one or more magnetic sensors configured to emit and/or otherwise direct an electromagnetic field toward the work surface 158, and to determine a disturbance in the emitted electromagnetic field caused by an object disposed on and/or at least partly beneath the work surface 158. Such a magnetic sensor may be configured to determine the presence of such an object, and/or to determine a distance between the sensor 182 and a surface of such an object. The sensor 182 may provide any such determined distances and/or other determined information to the controller 176 (e.g., via the network 138) at 408.

In still further examples, the sensor information received at 408 may comprise first information determined by the sensor 182 as the mobile machine 150 traverses the first pass 218 of the mobile machine travel path 214, second information determined by the sensor 182 as the mobile machine 150 traverses the second pass 220 of the mobile machine travel path 214 adjacent to the first pass 218, third information determined by the sensor 182 as the mobile machine 150 traverses the third pass 222 of the mobile machine travel path 214 adjacent to the second pass 220, and/or any amount of additional information associated with and/or determined by the sensor 182 as the mobile machine 150 traverses a portion of the work surface 158. In any of the examples described herein, the controller 176 of the mobile machine 150 may be configured to generate a worksite map 300 based at least partly on the sensor information (e.g., a plurality of sequential distances in the direction X) received at 408.

At 408, the controller 176 may also receive location information determined by the location sensor 180, and such location information may indicate locations of the mobile machine 150 as the mobile machine 150 traverses the mobile machine travel path 214. For example, the location sensor 180 carried by the mobile machine 150 may measure, detect, sense, calculate, and/or otherwise determine a plurality of GPS coordinates (e.g., longitude and latitude coordinates), UTS coordinates, and/or other information indicative of respective locations of the mobile machine 150 as the mobile machine 150 traverses the mobile machine travel path 214. In such examples, the location sensor 180 may determine a plurality of sequential GPS coordinates indicative of the location of the mobile machine 150 continuously, substantially continuously, and/or at regular or irregular time intervals (e.g., every 0.5 seconds, every 1 second, every 2 seconds, every 5 seconds, every 10 seconds, every 15 seconds, and/or at any other regular or irregular time interval). For instance, the location information received at 408 may comprise a first plurality of GPS coordinates indicating respective locations of the mobile machine 150 as the mobile machine 150 traverses the first pass 218 of the mobile machine travel path 214, a second plurality of GPS coordinates indicating respective locations of the mobile machine 150 as the mobile machine 150 traverses the second pass 220, a third plurality of GPS coordinates indicating respective locations of the mobile machine 150 as the mobile machine 150 traverses the third pass 222, etc.

It is understood that, at 408, the controller 176 may determine the location (e.g., in two-dimensional space and/or in three-dimensional space) of one or more objects (e.g., the object 228, the object 230, etc.) disposed on and/or at least partly beneath the work surface 158 based at least partly on the first sensor information received from the sensor 182 at a first time and indicative of a distance in the direction X of a surface of the object, and corresponding location information received from the location sensor 180 and indicative of the GPS location of the mobile machine 150 at the first time. When taken together, the controller 176 may use the sensor information and corresponding location information received 408 to generate a three-dimensional worksite map 300. For example, the first sensor information received at 408 may include first pass information determined by the sensor 182 and/or the location sensor 180 as the mobile machine 150 traverses the first pass 218 of the mobile machine travel path 214, second pass information determined by the sensor 182, and/or the location sensor 180 as the mobile machine 150 traverses the second pass 220 of the mobile machine travel path 214, and so on. In such examples, the controller 176 may generate the worksite map 300 based at least partly on such first pass information, and/or such second pass information, etc.

At 410, the controller 176 may generate a worksite map 300 based at least partly on the first sensor information received at 408. For example, at 410 the controller 176 may generate a worksite map 300 based at least partly on the information received from the sensor 182, taken together with corresponding location information received from the location sensor 180. The worksite map 300 generated at 410 may comprise a two-dimensional or three-dimensional point cloud or other such representation of the worksite 200 (e.g., of the area 202 and/or of the work surface 158). As described above with respect to at least FIG. 3, such a worksite map 300 may indicate and/or identify the peaks, valleys, contours, elevation, terrain changes, and/or other characteristics of the work surface 158 observed by the sensor 182. Such a worksite map 300 may also indicate the position, location, orientation, and/or other characteristics of objects (e.g., the object 228, the object 230, etc.) disposed on or at least partly beneath the work surface 158. As noted above, an example worksite map 300 may comprise one or more text files, data files, video files, digital image files, and/or other electronic files providing information indicative of the area 202 to be acted on by the slave machine 146, the work surface 158, the slave machine travel path 208, the mobile machine travel path 214, and/or other aspects of the particular worksite 200. For example, the worksite map 300 generated by the controller 152 at 410 may include location information comprising a first plurality of GPS coordinates indicating a location and/or extent of the first boundary 210, and a second plurality of GPS coordinates, indicating a location and/or extent of the second boundary 212. The worksite map 300 generated by the controller 176 at 410 may also include a plurality of GPS coordinates indicating respective locations of one or more objects (e.g., the first object 228, the second object 230, a hill, a valley, a body of water, a man-made obstruction, etc.) disposed on and/or at least partly beneath the work surface 158. For example, the worksite map 300 may include a plurality of GPS coordinates, UTS coordinates, elevation information, and/or other location information indicating respective locations of substantially all points along the work surface 158 and/or along the respective surfaces of the objects included in the worksite map 300. In still further examples, the worksite map 300 may include location information indicative of the mobile machine travel path 214. For example, the worksite map 300 may include a plurality of GPS coordinates indicating a location and/or extent of the mobile machine travel path 214 determined at 404. As noted above, in some examples the worksite map 300 generated by the controller 152 at 410 may also include location information comprising a plurality of GPS coordinates indicating a location and/or extent of a perimeter of the area 318.

It is understood that the controller 176 may generate the worksite map 300 at 410 through extrapolation, using one or more trigonometric algorithms, using one or more neural networks and/or machine learning algorithms, using fuzzy logic, using one or more look-up tables, and/or through one or more additional methods. In an example embodiment, the controller 152 may have an associated memory and/or may have access to such a memory in which various extrapolation models, trigonometric algorithms, machine learning algorithms, look-up tables, and/or other components may be stored for determining the worksite map 300 based at least partly on information received at 402 and/or 408.

At 412, the controller 176 may generate a second worksite plan based at least partly on the first sensor information received at 408 and/or the first worksite plan received at 402. In such examples, the second worksite plan generated at 412 may correspond to the worksite 200, the work surface 158, the shape, size, dimensions, topography, and/or other characteristics of the area 202 to be acted on by one or more slave machines disposed at the worksite 200, the number of each type of slave machine disposed at the worksite 200, the identity of the particular one or more slave machines (e.g., the slave machine 146) disposed at the worksite 200, one or more characteristics (e.g., a capacity, a throughput, etc.) of the particular one or more slave machines disposed at the worksite 200, etc.

In any of the examples described herein, at 412, the controller 176 may generate a second worksite plan that corresponds to one or more objectives, tasks, and/or other operations specified in the first worksite plan received at 402. For example, the first worksite plan received at 402 may comprise a relatively general worksite plan identifying one or more operations to be performed by the various machines and/or other components of the system 100 at the worksite 200. For example, such a first worksite plan may comprise one or more data files, image files, documents, text files, databases, metadata, classification tags, and/or other structures including information identifying the worksite 200, the work surface 158, the area 202, and/or any of the other information described above with respect to 402. Such an example first worksite plan may also include similar metadata, classification tags, information, and/or structures identifying one or more operations to be performed at the worksite 200.

For instance, an example first worksite plan received at 402 may include information identifying first operations comprising: removing 4 inches of asphalt, pavement, dirt, soil, sand, and/or other material from an area 202 of the work surface 158 that measures 200 feet wide by 800 feet long. Upon analyzing such example first operations, and comparing such first operations to one or more stored (e.g., electronic) operation libraries, stored databases, previously received worksite plans, lookup tables, and/or other stored information, at 412, the controller 176 may characterize such an example first worksite plan (e.g., by finding an approximate match with one or more stored paving operations/paving worksite plans) as a paving plan. In another embodiment of the present disclosure, an example first worksite plan received at 402 may include information identifying first operations comprising: digging a trench at an area 202 of the work surface 158 that measures 6 feet wide, 200 feet long, and 8 feet deep. Upon analyzing such example first operations, and comparing such first operations to one or more stored (e.g., electronic) operation libraries, stored databases, previously received worksite plans, lookup tables, and/or other stored information, at 412, the controller 176 may characterize such an example first worksite plan (e.g., by finding an approximate match with one or more stored excavation operations/excavation worksite plans) as an excavation plan. In still other embodiments, an example first worksite plan received at 402 may include information identifying first operations comprising: removing a built-up pile of material, located at a particular area 202 of the work surface 158, that measures 100 feet wide, 200 feet long, and 15 feet tall. Upon analyzing such example first operations, and comparing such first operations to one or more stored (e.g., electronic) operation libraries, stored databases, previously received worksite plans, lookup tables, and/or other stored information, at 412, the controller 176 may characterize such an example first worksite plan (e.g., by finding an approximate match with one or more stored mining operations/mining worksite plans) as a mining plan. The above operations, dimensions, and other factors are merely described for purposes of discussion, and in additional embodiments, other operations may be associated with the example first worksite plans described herein.

In any of the examples described herein, at 402 the controller 176 may generate a second worksite plan by augmenting, transforming, and/or modifying the first worksite plan (e.g., by augmenting, transforming, and/or modifying the information included in the first worksite plan) received at 402. For example, upon characterizing the first worksite plan received at 402 as being a paving plan, an excavation plan, a mining plan, and/or any other type of worksite plan, the controller 176 may access one or more stored operation libraries, previously received worksite plans, lookup tables, and/or other stored information corresponding to the particular type of worksite plan and/or the operations specified by the first worksite plan. For instance, in embodiments in which the first worksite plan received at 402 is characterized by the controller 176 at 412 as being a paving plan, at 412 the controller 176 may access a stored paving library. In other embodiments in which the first worksite plan received at 402 is characterized by the controller 176 at 412 is being an excavation plan, at 412 the controller 176 may access a stored excavation library, and so on. In such examples, the paving library, excavation library, and/or other libraries (e.g., a mining library, etc.) accessed by the controller 176 at 412 may include test data, empirical data, manufacturer specifications, and/or other information associated with each type of slave machine that may be used in operations corresponding to the library.

For example, in embodiments in which the first worksite plan received at 402 is characterized by the controller 176 at 412 as being a paving plan, at 412 the controller 176 may access a stored paving library. The stored paving library may include a listing of the various types of slave machines that may be utilized to perform paving operations. Such slave machines may include, for example, a cold planer (e.g., the slave machine 146 shown in FIG. 1), a paving machine (e.g., the slave machine 102 shown in FIG. 1), a haul truck (e.g., the slave machine 148 shown in FIG. 1), a backhoe loader, a compaction machine, and/or other paving equipment. Accordingly, the stored paving library accessed at 412 may include a listing of each of the above slave machines, as well as minimum, maximum, and/or optimal throughput ranges, travel speeds, compaction speeds, rotor and/or blade depths, hauling capacities, and/or other characteristics for each of the listed slave machines. In examples in which the accessed library lists and/or includes more than one model number for each type of listed machine (e.g., multiple cold planer models), such a library may include respective characteristics and/or other information corresponding to each model of the listed machine (e.g., minimum, maximum, and/or optimal rotor and/or blade depths for each cold planer model).

Generating the second worksite plan at 412 may also include identifying an optimal process for completing the operations specified in the first worksite plan received at 402. Such an "optimal" process may comprise the one or more tasks or other operations that, in combination, results in the completion of the operations specified in the first worksite plan in the least amount of time and/or by utilizing the fewest resources. For example, at 412, upon identifying the one or more operations specified in the first worksite plan (e.g., removing 4 inches of asphalt and/or other material from an area 202 of the work surface 158 that measures 200 feet wide by 800 feet long), and accessing a stored library (e.g., a paving library) that corresponds to the first worksite plan and/or to the operations specified thereby, the controller 176 may identify the particular slave machines known to be disposed at the worksite 200. At 412, the controller 176 may determine an optimal process for completing the paving operation specified by the first worksite plan based at least partly on, for example, the paving machines known to be available at the worksite 200, as well as the throughput ranges, rotor and/or blade depths, hauling capacities, and/or other characteristics of each of the available paving machines.

For example, in an embodiment in which, at 412, the controller 176 determines that six haul trucks and two cold planers are available at the worksite 200, the controller 176 may calculate and/or otherwise determine that a first process utilizing the two available cold planers and four of the six available haul trucks may enable the system 100 to complete the operations specified in the first worksite plan (e.g., removing 4 inches of asphalt and/or other material from an area 202 of the work surface 158 measuring 200 feet wide by 800 feet long) in 6 hours. In such an embodiment, at 412 the controller 176 may also determine that a second process utilizing the two available cold planers and five of the six available haul trucks may also enable the system 100 to complete the operations specified in the first worksite plan in 6 hours. In such an example embodiment, the limiting factor to completing the operations specified in the first worksite plan may be the throughput of the cold planers currently in use at the worksite 200. Accordingly, in such an example embodiment, the controller 176 may identify the first process as being the optimal process based at least partly on the first process utilizing fewer resources than the second process while performing the same amount of work in the same amount of time. In such an example, the controller 176 may select the first process at 412, based at least partly on such a determination.

At 412, and as part of generating the second worksite plan, the controller 176 may generate respective instructions for each slave machine associated with and/or otherwise utilized in the selected optimal process. Such instructions may include, among other things, a slave machine travel path corresponding to each of the slave machines to be utilized in performing the optimal process. Each respective slave machine travel path may be determined by the controller 176 based on the shape, size, and/or other configurations of the work surface 158 and/or of the area 202, the dimensions of the slave machine, and/or other parameters. For instance, in examples in which the slave machine 146 comprises the cold planer illustrated in FIG. 2, the slave machine travel path 208 may determined based on the width L of the slave machine 146 and/or other dimensions corresponding to the width of the rotor 156. Similar to the process described above with respect to determining the mobile machine travel path 214, the controller 176 may determine the slave machine travel path 208 by, for example, dividing the width $W_1$ by the width L of the slave machine 146, and may determine a slave machine travel path 208 that enables the slave machine 146 to perform the operations specified by the first worksite plan in accordance with the optimal process described above. Any of the processes described above with respect to the mobile machine travel path 214 may be utilized by the controller 176 to determine the slave machine travel path 208.

For example, at 412, the controller 176 may calculate, extrapolate, and/or otherwise determine the slave machine travel path 208 based on a known width L of the slave machine 146 and/or of the rotor 156, as well as the location of the first boundary 210 and the location of the second boundary 212. For example, in some embodiments the width L of the slave machine 146 may be substantially equal to the desired width $W_1$ of the area 202 specified in the paving plan. Accordingly, the controller 152 may determine a slave machine travel path 208 extending substantially centrally between the first boundary 210 and the second boundary 212. Alternatively, the width L of the slave machine 146 may be less than the desired width $W_1$ of the area 202 specified in the paving plan. In such examples, at 404 the controller 152 may determine a first cold planer travel path spaced a first distance (e.g., in the direction Z') from the first boundary 210, and a second cold planer travel path spaced a second distance (e.g., in the direction Z) from the second boundary 212.

The instructions generated by the controller 176 at 412 may also include one or more travel speeds associated with each of the slave machine travel paths. Such travel speeds may be determined by the controller 176 based on, for example, minimum, maximum, and/or optimal travel speeds stored in one or more of the libraries described above, one or more speed limits associated with the worksite 200, previous operations performed by the same or similar slave machines, and/or other information accessible by the controller 176. The controller 176 may determine such travel speeds in a manner similar to that described above with respect to 404. Such instructions may further include one or more control parameters associated with activating, deactivating, raising, lowering, manipulating, and/or otherwise operating one or more work tools, implements, conveyors, booms, sticks, buckets, and/or other components of each of the slave machines. In such examples, the instructions generated by the controller 176 at 412 may include, for each respective slave machine, one or more such control parameters corresponding to each location along the slave machine travel path of the slave machine. Accordingly, the second worksite plan generated by the controller 176 at 412 may include, among other things, an indication and/or identification of each of the slave machines, present at the worksite 200, to be utilized in performing at least part of the second worksite plan, as well as instructions that may be executed by the controllers of each of the respective slave machines.

At 414, the controller 176 may provide instructions to the slave machine 146 which, when executed by the controller 152 of the slave machine 146, may cause the controller 152 of the slave machine 146 to control the slave machine 146 to perform at least part of the second worksite plan generated at 412. For example, at 414, the controller 176 may provide instructions and/or other information (e.g., the worksite map 300 generated at 410, the one or more slave machine travel paths 208 determined at 412, the one or more travel speeds generated at 412, the one or more control parameters associated with operating one or more work tools, implements, and/or other components of each of the slave machines generated at 412, etc.) to the controller 152, via the network 138. In any of the examples described herein, the instructions provided by the controller 176 at 414 may, when executed by the controller 152 of the slave machine 146, cause the controller 152 to operate the slave machine 146 in an autonomous control mode and/or in a substantially autonomous control mode.

For example, the first instructions and/or other information provided to the slave machine 146 at 414 may be indicative of the slave machine travel path 208 determined at 412. For example, the controller 176 of the mobile machine 150 may utilize the communication device 178 to transmit one or more signals, and/or other information to the controller 152 of the slave machine 146 via the network 138 and by way of the communication device 154. In such examples, upon receipt of the slave machine travel path 208, the controller 152 may control the slave machine 146 to traverses at least a portion of the slave machine travel path 208 (e.g., in an autonomous control mode and/or in a substantially autonomous control mode). For example, at 414 the controller 152 may cause the slave machine 146 to traverse at least part of the slave machine travel path 208, in the direction X shown in FIG. 2, at one or more travel speeds included in the instructions provided at 414 and corresponding to the at least part of the slave machine travel path 208 being traversed. While traversing the slave machine travel path 208 in this manner, the controller 152 may also control one or more work tools, implements, and/or other components (e.g., the rotor 156) of the slave machine 146 to operate in accordance with the one or more control parameters included in the instructions provided at 414. For example, at 414, the controller 152 may control one or more pneumatic, hydraulic, electric, and/or other components of the slave machine 146 to lower the rotor 156 relative to the work surface 158. At 414, the controller 152 may also control one or more such components to rotate the rotor 156, relative to the work surface 158, while the rotor 156 is in contact with the work surface 158. In such examples, operating the rotor 156 in this manner may assist in removing at least part of the work surface 158 in accordance with, for example, the second worksite plan generated at 412.

In some examples, the first instructions provided by the controller 176 to the slave machine 146 at 414 may also indicate various locations along the slave machine travel path 208 at which one or more actions should be taken in order to avoid damage to the slave machine 146, and/or in order to avoid contact with, damage to, and/or harm to one or more objects (e.g., the object 228, the object 230, etc.) disposed on and/or at least partly beneath the work surface 158. Such actions may include changing (e.g., raising) a position of the rotor 156 relative to the frame 159 of the slave machine 146 and/or relative to the work surface 158. Such actions may also include changing a travel speed and/or a heading of the slave machine 146 such that contact with an object disposed on and/or at least partly beneath the work surface 158 can be avoided. For example, the first instructions provided by the controller 176 at 414 may include first GPS coordinates indicating the first location 302 along the slave machine travel path 208 at which the rotor 156 should be raised, in a direction away from the work surface 158, in order to avoid contact with an object 228 disposed on the work surface 158. In such examples, the first instructions provided by the controller 176 at 414 may also include second GPS coordinates indicating the second location 304 along the slave machine travel path 208 at which the rotor 156 may be lowered, in a direction toward the work surface 158, after the rotor 156 and/or the slave machine 146 has moved past such an object 228. In such examples, the controller 152 may control operation of the slave machine 146 in accordance with such instructions in order to avoid damage to the slave machine 146, and/or in order to avoid contact with, damage to, and/or harm to the object 228.

Figure 5:
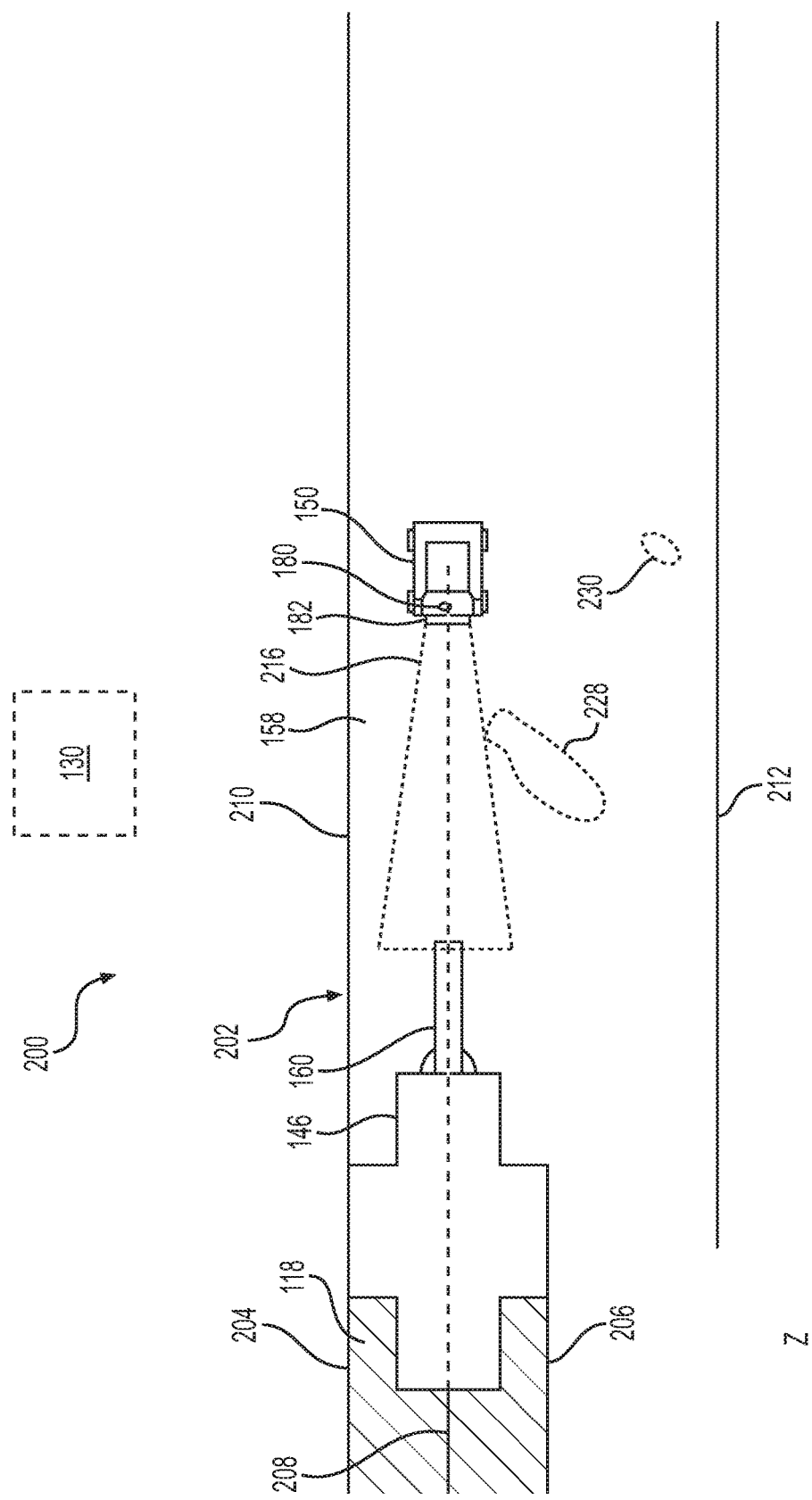
FIG. 5 is a schematic illustration of a slave machine and a master machine traversing a work surface, in accordance with another example embodiment of the present disclosure. In the example illustrated in FIG. 5, the master machine is positioned such that at least part of the slave machine is disposed within a field of view of a sensor carried by the master machine.

In some examples, at 414 the controller 176 may control the mobile machine 150 to traverses one or more portions of the mobile machine travel path 214 and/or an additional mobile machine travel path while the slave machine 146 traverses the slave machine travel path 208. For example, at 414 the controller 176 may control the mobile machine 150 to traverse such an additional mobile machine travel path while staying a desired distance ahead of, behind, and/or to the side of the slave machine 146 as the slave machine 146 is controlled to traverse the slave machine travel path 208. As shown in FIG. 5, in some examples, such an additional mobile machine travel path may comprise and/or substantially overlay the slave machine travel path 208. In other example embodiments, on the other hand, such an additional mobile machine travel path may be spaced from (e.g., substantially parallel to) the slave machine travel path 208. In any of the examples described herein, the controller 176 may determine such an additional mobile machine travel path at 414, and the additional mobile machine travel path may comprise a path configured to optimize the positioning (e.g., the location and/or orientation) of the mobile machine 150, in a dynamic, real time fashion, such that additional sensor information may be obtained by the sensor 182 of the mobile machine 150 as the slave machine 150 traverses the slave machine travel path 208. For example, the controller 176 may determine an additional mobile machine travel path, at 414, that may be configured such that at least part of the rotor 156, the conveyor system 160, the frame 159, and/or other components of the slave machine 146 may remain substantially within the field of view 216 of the sensor 182 as the slave machine 146 traverses the slave machine travel path 208.

As shown in FIG. 5, in some examples the mobile machine 150 may be controlled to traverse an additional mobile machine travel path substantially overlaying the slave machine travel path 208. In such examples, the mobile machine 150 may be oriented such that the sensor 182 faces the slave machine 146. Additionally, in such examples the mobile machine 150 may be controlled to maintain a desired distance (e.g., 5 feet, 10 feet, 15 feet, etc.) from the frame 159 of the slave machine 146 as the slave machine 146 traverses the slave machine travel path 208. Controlling the mobile machine 150 in this way may maintain at least part of the frame 159, the rotor 156, the conveyor system 160, and/or other implements or components of the slave machine 146 within the field of view 216 of the sensor 182 as the slave machine 146 traverses the slave machine travel path 208. Thus, the sensor 182 and/or other components of the mobile machine 150 may monitor the movement, position, operation, and/or other parameters of such components of the slave machine 146 as the slave machine 146 is controlled to perform at least part of the second worksite plan in accordance with the first instructions provided at 414. As will be described below, the sensor 182, and/or other components of the mobile machine 150 may also monitor the accuracy with which the slave machine 146 is performing at least part of the second worksite plan in accordance with the first instructions. In such examples, using the sensor 182 carried by the mobile machine 150 (as opposed to the slave machine 146) to determine the movement, position, operation, and/or other parameters of the various components of the slave machine 146, and to determine the accuracy with which the slave machine 146 is performing the second worksite plan, may improve the accuracy of such determinations at least because the field of view 216 of the sensor 182 may remain substantially unencumbered and/or unblocked as the slave machine 146 traverses the slave machine travel path 208. Additionally, because the sensor 182 is carried by the mobile machine 150, and not by the slave machine 146, the risk of damage and/or miscalibration to the sensor 182 may be significantly reduced.

At 416, the controller 176 may receive second sensor information associated with the work surface 158 and/or associated with the slave machine 146. For example, at 416 the controller 176 may receive second sensor information collected, sensed, captured, and/or otherwise determined by the at least one sensor 182 of the mobile machine 150 as the mobile machine 150 traverses, at least in part, the additional mobile machine travel path determined at 414. As noted above, in some embodiments the sensor 182 may comprise at least one RADAR sensor, LIDAR sensor, SONAR sensor, image capture device, and/or other sensor carried by the mobile machine 150. Additionally, the controller 176 may receive location information from the location sensor 180. As the mobile machine 150 traverses the additional mobile machine travel path. Accordingly, the second sensor information received at 416 may comprise sensor information received from the at least one sensor 182, as well as corresponding location information received from the location sensor 180. In any of the examples described herein, the second sensor information received at 416 may be indicative of the slave machine 146 performing at least part of the second worksite plan (generated at 412 and corresponding to the first instructions provided at 414) at the worksite 200.

For instance, at 416 and while the mobile machine 150 traverses the additional mobile machine travel path described above, the sensor 182 may observe, sense, detect, and/or otherwise determine images, distances, relative positions, and/or locations associated with the rotor 156, the conveyor system 160, the frame 159, and/or other components of the slave machine 146 as the slave machine 146 traverses the slave machine travel path 208. As shown in FIG. 5, in such examples, at 416 at least part of the rotor 156, the conveyor system 160, the frame 159, and/or other components of the slave machine 146 may remain within the field of view 216 while the mobile machine 150 traverses the additional mobile machine travel path (e.g., a travel path substantially overlaying the slave machine travel path 208). At 416 and while the mobile machine 150 traverses the additional mobile machine travel path, the location sensor 180 may also determine corresponding GPS coordinates, UTS coordinates, and or other location information associated with the mobile machine 150. At 416, the controller 176 may correlate such location information with the sensor information received from the sensor 182 in order to determine various locations of the slave machine 146, and/or its components, as the slave machine 146 traverses the slave machine travel path 208. As will be described below, in any of the examples described herein, the controller 176 of the mobile machine 150 may generate at least one of a safety metric and an accuracy metric based at least partly on the second sensor information received at 416.

At 418, the controller 176 may generate a safety metric. In example embodiments, the safety metric generated at 418 may comprise one or more integers, percentages, fractions, decimals, ranges, and/or other quantifiable metric indicating the likelihood (e.g., the probability) that one or more components of the slave machine 146 will contact an object (e.g., the object 228, the object 230, etc.) while the slave machine 146 traverses the slave machine travel path 208 and/or otherwise performs at least part of the second worksite plan at the worksite 200. The controller 176 may generate the safety metric at 418 based at least partly on the second sensor information received at 416, the shape, size, dimensions (e.g., the width L), configurations, components (e.g., the dimensions, orientations, and/or movements of the rotor 156, the conveyor system 160, etc.), and/or other aspects of the particular slave machine 146, the slave machine travel path 208 determined at 412, the extent, orientation, and/or location of the object (e.g., the object 228, the object 230, etc.), and/or other characteristics of the worksite 200.

In examples in which the object (e.g., the object 228) comprises an inanimate object and/or a stationary object disposed on or at least partly beneath the work surface 158, at 418, the controller 176 may generate the safety metric by determining a projected or anticipated movement of the slave machine 146 along the slave machine travel path 208. Such a projection (e.g., a two-dimensional projection or a three-dimensional projection) may be made based at least partly on the dimensions of the slave machine 146, the configuration of the slave machine travel path 208, the travel speed of the slave machine 146, and a current location of the object 228 as identified in the second sensor information received at 416. In the case of such a stationary object 228, the controller 176 may be able to determine, with a relatively high degree of accuracy, whether the slave machine 146 will contact the object 228 as the slave machine 146 traverses the slave machine travel path 208. For example, if the controller 176 determines, at 418, that the slave machine 146 will contact the stationary object 228 based on the location of the object 228, the width L of the slave machine 146, and the determined slave machine travel path 208, the controller 176 may generate a safety metric equal to 100% at 418.

On the other hand, in examples in which the object 228 comprises an animate object (e.g., a human operator) and/or a moving object disposed on the work surface 158, at 418, the controller 176 may generate the safety metric by determining a projected or anticipated movement of the slave machine 146 along the slave machine travel path 208, and a projected or anticipated movement of the object 228 along its current path or trajectory. For instance, the controller 176 may project the movement of the slave machine 146 based at least partly on the dimensions of the slave machine 146, the configuration of the slave machine travel path 208, and/or the travel speed of the slave machine 146 as identified in the second sensor information received at 416.

In the case of a moving object 228, the controller 176 may determine, at 418, a current travel vector (e.g., heading) of the moving object 228, a speed of the object 228, and an acceleration of the object 228 based on the second sensor information received at 416. With this information, the controller 176 may determine whether the slave machine 146 will contact the object 228 as the slave machine 146 traverses the slave machine travel path 208 and based on steady state conditions (e.g., the travel speed, headings, and/or other parameters indicative of the motion of the slave machine 146 remaining substantially constant). The controller 176 may utilize one or more dynamics and/or kinematics equations associated with calculating the motion of various objects in making such determinations at 418. In such examples, if the controller 176 determines, at 418, that the slave machine 146 will contact such a moving object 228 based on the factors above, the controller 176 may generate a safety metric equal to 100% at 418.

At 418, the controller 176 may also add one or more weight factors, coefficients, additional terms, factors of safety, or other components to such equations in order to account for situations in which the travel speeds, headings, and/or other parameters of the slave machine 146 and/or the moving object 228 do not remain substantially constant. For instance, when calculating the expected or projected motion of the object 228 at 418, the controller 176 may modify such calculations by, for example, increasing a velocity value used in the calculation (e.g., associated with a velocity of the object 228) by a desired factor (e.g., 25%), decreasing the velocity value by a desired factor (e.g., 25%), increasing or decreasing an acceleration value used in the calculation (e.g., associated with an acceleration of the object 228) by a desired factor (e.g., 25%), increasing or decreasing a deceleration value used in the calculation (e.g., associated with a deceleration of the object 228) by a desired factor (e.g., 25%), changing a heading/vector value used in the calculation (e.g., associated with a heading/vector of the object 228) by a desired factor (e.g., 25%), etc. At 418, the controller 176 may utilize one or more dynamics and/or kinematics equations associated with calculating the motion of various objects to determine whether the slave machine 146 will contact the moving object 228 as a result of any such modified values. In such examples, if the controller 176 determines, at 418, that the slave machine 146 will contact such a moving object 228 based on the modified factors/values above, the controller 176 may generate a safety metric equal to 100%, less the factor of safety utilized at 418. For instance, in the above example, if the desired factor is 25%, and the controller 176 determines, at 418, that contact will occur based on the modified factors/values above, the controller 176 may generate a safety metric equal to 75% (e.g., 100%–25%=75%) at 418.

At 420, the controller 176 may compare the safety metric generated at 418 to a first threshold associated with such safety metrics. It is understood that any desired first threshold may be utilized at 420 for such a comparison. For example, if a first threshold having a value of 85% is utilized for comparison purposes at 420, the controller 176 may compare the safety metric generated at 418 to such a value. In examples in which the safety metric generated at 418 is less than the first threshold utilized at 420, the controller 176 may determine that the safety metric generated at 418 fails to satisfy such a first threshold (Step: 420—No). For instance, in the example described above in which the controller 176 generated a safety metric associated with a moving object 228 equal to 75% at 418, such a safety metric would fail to satisfy a first threshold having a value of 85% (e.g., 75% is less than 85%). In such examples, control would proceed to 422.

At 422, the controller 176 may generate second instructions associated with the second worksite plan generated at 412. For example, when executed by the controller 152 of the slave machine 146, such second instructions may cause the controller 152 of the slave machine 146 to perform at least part of the second worksite plan. Such second instructions may, however, different from the first instructions provided to the slave machine 146 at 414. For example, at 422 the controller 176 may determine an additional and/or modified slave machine travel path. Such an additional and/or modified slave machine travel path may comprise a travel path which, when traversed by the slave machine 146, will cause the slave machine 146 to avoid contact with the stationary and/or moving object 228 described above. The second instructions generated at 422 may include, among other things, such an additional and/or modified slave machine travel path. The controller 176 may determine such an additional and/or modified slave machine travel path in a manner similar to that described above with respect to the slave machine travel path 208 generated at 412.

The second instructions generated at 422 may also include one or more travel speeds associated with the additional and/or modified slave machine travel path. Such travel speeds may be determined by the controller 176 at 422 based on, for example, minimum, maximum, and/or optimal travel speeds stored in one or more of the libraries described above, one or more speed limits associated with the worksite 200, previous operations performed by the same or similar slave machines, and/or other information accessible by the controller 176. The controller 176 may determine such travel speeds in a manner similar to that described above with respect to 404. Such second instructions may further include one or more control parameters associated with activating, deactivating, raising, lowering, manipulating, and/or otherwise operating one or more work tools, implements, conveyors, booms, sticks, buckets, and/or other components of the slave machine 146. In such examples, the second instructions generated by the controller 176 at 422 may include one or more such control parameters corresponding to each location along the additional and/or modified slave machine travel path generated at 422. Any of the processes described above with respect to the first instructions generated at 412 may be used by the controller 176 to generate the second instructions at 422.

At 424, the controller 176 may provide the second instructions to the slave machine 146. For example, at 424 the controller 176 may provide such second instructions and/or other information (e.g., the worksite map 300 generated at 410, the one or more additional and/or modified slave machine travel paths determined at 422, the one or more travel speeds generated and/or otherwise determined at 422, the one or more control parameters generated and/or otherwise determined at 422, etc.) to the controller 152, via the network 138. Control may proceed from 424 to 416. For example, at 416 the controller 176 may receive third sensor information determined by the sensor 182, and such third sensor information may be indicative of the slave machine 146 operating according to the second instructions provided at 424. In such examples, the controller 176 may cause the mobile machine 150 to traverse an additional mobile machine travel path that maintains the mobile machine 150 at a substantially constant distance from the slave machine 146 as the slave machine traverses the additional and/or modified slave machine travel paths determined at 422. In such examples, the third sensor information may be indicative of the slave machine 146 traversing the one or more additional and/or modified slave machine travel paths.

With continued reference to FIG. 4, if the controller 176 determines, at 420, that the safety metric generated at 418 is greater than or equal to the first threshold utilized at 420, the controller 176 may determine that the safety metric generated at 418 satisfies such a first threshold (Step: 420—Yes). For instance, in the example described above in which the controller 176 generated a safety metric associated with a stationary object 228 equal to 100% at 418, such a safety metric would satisfy a first threshold having a value of 85% (e.g., 100% is greater than 85%). In such examples, control would proceed to 426.

At 426, the controller 176 may generate an accuracy metric. In example embodiments, the accuracy metric generated at 426 may comprise one or more integers, percentages, fractions, decimals, ranges, and/or other quantifiable metric indicative of at least one of a location of the frame 159 of the slave machine 146 as the slave machine 146 performs at least part of the second worksite plan, a position of the rotor 156, the conveyor system 160, a work tool, and/or any other implement or component of the slave machine 146, relative to the frame 159 and/or relative to the work surface 158, as the slave machine 146 performs at least part of the second worksite plan, and a characteristic of a portion of the work surface 158 modified by the slave machine 146 while performing at least part of the second worksite plan. Such a characteristic may include, for example, a depth, width, length, and/or other dimension of one or more cuts made by a component of the slave machine 146, an elevation of the work surface 158 after the work surface 158 has been acted on by such a component, a position of one or more boundaries of an area (e.g., the area 202) of the work surface 158 acted on by the component of the slave machine 146, etc. The controller 176 may generate the accuracy metric at 426 based at least partly on the second sensor information received at 416, the shape, size, dimensions (e.g., the width L), configurations, and/or other aspects of the particular slave machine 146, the slave machine travel path 208 determined at 412, and/or other characteristics of the worksite 200. The controller 176 may also generate the accuracy metric at 426 based at least partly the dimensions, orientations, and/or movements of the rotor 156, the conveyor system 160, a work tool, and/or other implements or components of the slave machine 146.

For example, at 426 the controller 176 may compare one or more measurements made by the sensor 182, and indicated by the second sensor information received at 416, to the one or more corresponding operations specified in the first worksite plan and/or in the second worksite plan. For instance, as noted above, an example first worksite plan received at 402 may include information identifying first operations comprising: removing 4 inches of asphalt, pavement, dirt, soil, sand, and/or other material from an area 202 of the work surface 158. In such an example embodiment, at 426 the controller 176 may monitor the actual depth of a cut in the work surface 158 being made by the rotor 156 (e.g., as indicated by the second sensor information received at 416) as the slave machine 146 traverses the slave machine travel path 208. At 426, the controller 176 may compare the actual cut depth, as indicated by the second sensor information, with the specified cut depth of 4 inches (e.g., as indicated by the second worksite plan generated at 412, and corresponding to the first worksite plan), and may generate an accuracy metric (e.g., a percentage, an absolute difference value, etc.) based on such a comparison. For instance, in examples in which the actual cut depth is 4.7 inches, and the specified cut depth is 4 inches, the absolute difference value may be 0.7 inches. In such examples, the accuracy metric generated at 426, based on an absolute difference between the actual cut depth and the specified cut depth, may be 0.7 inches. As noted above, in other examples, a percentage based on such a difference could also be generated and/or used as an accuracy metric. In further examples, such as examples in which two or more difference values are being evaluated at 426 (e.g., a first absolute difference between the specified cut depth and an actual cut depth at a left-hand side of a cut area, and a second absolute difference between the specified cut depth and an actual cut depth at a right-hand side of the cut area), one or more average differences or other average values could be generated and/or used as accuracy metrics at 426.

At 428, the controller 176 may compare the accuracy metric generated at 426 to a corresponding second threshold. Any desired second threshold may be utilized by the controller 176 at 428 for such a comparison. For example, if a second threshold having a value of 0.5 inches is utilized for comparison purposes at 428, the controller 176 may compare the accuracy metric generated at 426 to such a value. In examples in which the accuracy metric generated at 426 is less than the second threshold utilized at 426, the controller 176 may determine that the accuracy metric generated at 426 satisfies such a second threshold (Step: 428—Yes). In such examples, control would proceed to 416. For example, at 416 the controller 176 may receive third sensor information determined by the sensor 182, and such third sensor information may be indicative of the slave machine 146 operating according to the first instructions provided at 414. In such examples, the controller 176 may cause the mobile machine 150 to traverse an additional mobile machine travel path that maintains the mobile machine 150 at a substantially constant distance from the slave machine 146 as the slave machine traverses the slave machine travel path 208 determined at 412. In such examples, the third sensor information may be indicative of the slave machine 146 traversing the slave machine travel path 208.

On the other hand, in examples in which the accuracy metric generated at 426 is greater than or equal to the second threshold utilized at 426, the controller 176 may determine that the accuracy metric generated at 426 fails to satisfy such a second threshold (Step: 428—No). For instance, in the example described above in which the controller 176 generated an accuracy metric equal to 0.7 inches at 426, such an accuracy metric would fail to satisfy a second threshold having a value of 0.5 inches (e.g., 0.7 is greater than 0.5). In such examples, control would proceed to 430.

At 430, the controller 176 may generate third instructions associated with the second worksite plan generated at 412. For example, when executed by the controller 152 of the slave machine 146, such third instructions may cause the controller 152 of the slave machine 146 to perform at least part of the second worksite plan. Such third instructions may, however, differ from the first instructions provided to the slave machine 146 at 414 and the second instructions described above with respect to 422. For example, at 430 the controller 176 may determine a correction to be made to at least one of the slave machine travel path 208 and the various control parameters associated with activating, deactivating, raising, lowering, manipulating, and/or otherwise operating one or more work tools, rotors 156, implements, conveyors, booms, sticks, buckets, and/or other components of the slave machine 146.

In some examples, at 430 the controller 176 may compare the actual cut depth, as indicated by the second sensor information received at 416, with the cut depth specified by the second worksite plan generated at 412 (and corresponding to the first worksite plan received at 402). In such examples, the controller 176 may determine a difference value based on such a comparison. For instance, in examples in which the actual cut depth is 4.7 inches, and the specified cut depth is 4 inches, the difference value may be 0.7 inches. In such examples, and based on the difference value of 0.7 inches, the controller 176 may determine that the rotor 156 of the slave machine 146 should be raised by 0.7 inches relative to the frame 159 of the slave machine 146 and/or relative to the work surface 158. Accordingly, based at least partly on such a determination, at 430 the controller 176 may generate third instructions executable by the controller 152 of the slave machine 146 to raise the rotor 156 of the slave machine 146 by 0.7 inches relative to the frame 159.

Alternatively, in other examples in which the difference value comprises a negative value (e.g., the actual cut depth is 3.5 inches and the specified cut depth is 4 inches, therefore resulting in a difference value of −0.5 inches), at 430 the controller 176 may determine that the rotor 156 of the slave machine 146 should be lowered by 0.5 inches relative to the frame 159 of the slave machine 146 and/or relative to the work surface 158. Accordingly, based at least partly on such a determination, at 430 the controller 176 may generate third instructions executable by the controller 152 of the slave machine 146 to lower the rotor 156 of the slave machine 146 by 0.5 inches relative to the frame 159.

In still further examples, at 430 the controller 176 may compare the actual location of a boundary of the work surface 158 (e.g., an actual location of the boundary 204 as formed by the rotor 156), as indicated by the second sensor information received at 416, with the location of the boundary specified by the second worksite plan generated at 412 (and corresponding to the first worksite plan received at 402). In such examples, the controller 176 may determine a difference value based on such a comparison. For instance, based on an example comparison, the controller 176 may determine at 430 that the actual boundary location is 6 inches off (e.g., in the direction Z) from the boundary location specified by the second worksite plan. In some examples, such a determination may be made using on GPS coordinates, UTS coordinates, and/or other location information included in the second sensor information received at 416. In such examples, and based on the difference value of 6 inches, the controller 176 may determine that the slave machine travel path 208 should be modified to steer the slave machine 146 a total of 6 inches in the direction Z'. Accordingly, based at least partly on such a determination, at 430 the controller 176 may generate third instructions executable by the controller 152 of the slave machine 146 to steer the slave machine 146 a total of 6 inches in the direction Z'. Such third instructions may include a new and/or modified slave machine travel path which, when executed by the controller 152, results in such a change.

The third instructions generated at 430 may also include one or more travel speeds associated with the additional and/or modified slave machine travel path. Such travel speeds may be determined by the controller 176 at 430 based on, for example, minimum, maximum, and/or optimal travel speeds stored in one or more of the libraries described above, one or more speed limits associated with the worksite 200, previous operations performed by the same or similar slave machines, and/or other information accessible by the controller 176. The controller 176 may determine such travel speeds in a manner similar to that described above with respect to 404. Any of the processes described above with respect to the first instructions generated at 412 may be used by the processor 176 to generate the third instructions at 430.

At 432, the processor 176 may provide the third instructions to the slave machine 146. For example, at 432, the controller 176 may provide such third instructions and/or other information (e.g., the worksite map 300 generated at 410, the one or more additional and/or modified slave machine travel paths determined at 430, the one or more travel speeds generated and/or otherwise determined at 430, the one or more control parameters generated and/or otherwise determined at 430, etc.) to the controller 152, via the network 138. Control may proceed from 432 to 416. For example, at 416 the controller 176 may receive third sensor information determined by the sensor 182, and such third sensor information may be indicative of the slave machine 146 operating according to the third instructions provided at 432. In such examples, the controller 176 may cause the mobile machine 150 to traverse an additional mobile machine travel path that maintains the mobile machine 150 at a substantially constant distance from the slave machine 146 as the slave machine traverses a new and/or modified slave machine travel paths determined at 430. In such examples, the third sensor information may be indicative of the slave machine 146 traversing the one or more new and/or modified slave machine travel paths. Additionally or alternatively, the third sensor information received at 416 may be indicative of a change in the various control parameters associated with activating, deactivating, raising, lowering, manipulating, and/or otherwise operating one or more work tools, rotors 156, implements, conveyors, booms, sticks, buckets, and/or other components of the slave machine 146.

INDUSTRIAL APPLICABILITY

The present disclosure describes systems and methods for controlling various operations of a mobile machine 150 (e.g., an autonomous mobile machine) and/or a slave machine 146 (e.g., an autonomous slave machine) at a worksite 200. In particular, the systems and methods described herein may be used to determine a mobile machine travel path 214 defined by a work surface 158 of the worksite 200. The mobile machine 150 may be controlled to traverse the mobile machine travel path 214 such that sensor information indicative of the topography of the work surface 158, the identity, presence, location, dimensions, and/or other characteristics of one or more objects 228, 230 disposed at or at least partly beneath the work surface 158, and/or other information associated with the work surface 158 may be determined. In example methods of the present disclosure, such information, either alone or in combination with additional information (e.g., a first worksite plan) received by a controller 176 of the mobile machine 150, may be used by the controller 176 to generate one or more worksite maps 300 and/or to generate a second worksite plan associated with performing one or more operations at the worksite 200.

The controller 176 may also provide instructions to one or more slave machines (e.g., the slave machine 146) at the worksite 200 configured to perform at least part of the second worksite plan. The controller 176 may receive additional sensor information indicative of the slave machine 146 performing at least part of the second worksite plan in accordance with the provided instructions, and may generate one or more safety metrics and/or accuracy metrics based at least partly on such additional sensor information. The controller 176 may generate additional instructions based at least partly on the safety metric or the accuracy metric failing to satisfy a corresponding threshold. The controller 176 may provide such additional instructions to the slave machine 146 such that, for example, contact between the slave machine 146, and/or one or more components thereof (e.g., the rotor 156), and one or more objects 228, 230 may be avoided. Such additional instructions may also cause the slave machine 146 to perform the operations specified in the second worksite plan with greater accuracy.

As a result, the various systems and methods described herein may be used to avoid damage to the slave machine 146 caused by contact between the slave machine 146 and one or more objects 228, 230 disposed at the worksite 200. By eliminating such contact, the systems and methods described herein may extend the useful life of the slave machine 146, minimize downtime associated with maintenance and/or repair of the slave machine 146, and thereby improve worksite efficiency. Eliminating such contact may also improve worksite safety in situations in which, for example, one or more of the objects 228, 230 comprises a human. Additionally, by monitoring the accuracy with which the slave machine 146 performs the second worksite plan, and generating additional instructions in situations in which, for example, one or more corresponding accuracy metrics fails to satisfy an accuracy threshold, the example systems and methods described above may provide considerable cost savings and efficiency improvements over existing systems and methods. The example systems and methods described herein may also reduce the time and labor required for monitoring activities previously performed by one or more human operators.

Additionally, the sensor information received from the sensor 182 mounted to the ground-based mobile machine 150 may be inherently more accurate and easier to obtain than similar sensor information obtained from one or more sensors carried by, for example, a drone or other aerial machine. Moreover, because the sensor 182 is disposed on the autonomous mobile machine 150, and not the slave machine 146, the sensor 182 may accurately and effectively monitor the location of the slave machine 146, the performance of the second worksite plan by the slave machine 146, and/or the presence or location of one or more objects 228, 230 located on the work surface 158, without the respective field of view of the sensor 182 being obstructed by the conveyor system 160, the frame 159, the operator station, and/or other components of the slave machine 146.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
    receiving information indicative of a first worksite plan, the first worksite plan corresponding to a worksite having a work surface;
    determining a first mobile machine travel path extending along the work surface based at least partly on the information;
    causing an autonomous mobile machine to traverse the first mobile machine travel path;
    receiving first sensor information associated with the work surface, wherein the first sensor information is determined by at least one sensor of the autonomous mobile machine as the autonomous mobile machine traverses the first mobile machine travel path;

generating a second worksite plan based at least partly on the first sensor information, the second worksite plan corresponding to a slave machine disposed at the worksite and comprising a three-dimensional representation of an area of the worksite to be acted on by the slave machine;

providing instructions to the slave machine which, when executed by a controller of the slave machine, cause the controller of the slave machine to control the slave machine to perform at least part of the second worksite plan at the area of the worksite;

causing the autonomous mobile machine to traverse a second mobile machine travel path extending along the work surface while the slave machine performs the at least part of the second worksite plan, the autonomous mobile machine being controlled, in real time, to:
  maintain a component of the slave machine within a field of view of the at least one sensor as the slave machine traverses a slave machine travel path defined by the at least part of the second worksite plan, and
  maintain a desired distance from a frame of the slave machine as the slave machine traverses the slave machine travel path;

receiving second sensor information determined by the at least one sensor, the second sensor information being indicative of the slave machine performing the at least part of the second worksite plan at the area of the worksite; and generating at least one of a safety metric and an accuracy metric based at least partly on the second sensor information.

2. The method of claim 1, wherein the first sensor information comprises first pass information determined by the at least one sensor as the autonomous mobile machine traverses a first pass of the first mobile machine travel path, and second pass information determined by the at least one sensor as the autonomous mobile machine traverses a second pass of the first mobile machine travel path adjacent to the first pass, the method further including:
  generating a worksite map based at least partly on the first pass information and the second pass information, wherein the worksite map comprises the three-dimensional representation of the area, and the three-dimensional representation of the area includes a visual representation of an object disposed at least partly beneath the work surface.

3. The method of claim 2, wherein the first pass information comprises a first plurality of GPS coordinates indicating locations of the autonomous mobile machine as the autonomous mobile machine traverses the first pass, and the second pass information comprises a second plurality of GPS coordinates indicating locations of the autonomous mobile machine as the autonomous mobile machine traverses the second pass.

4. The method of claim 1, wherein the three-dimensional representation comprises a three-dimensional point cloud indicative of the work surface, and identifying a location of an object disposed at least partly beneath the work surface.

5. The method of claim 1, wherein the mobile machine travel path comprises a number of passes along the work surface, and determining the mobile machine travel path comprises determining the number of passes based at least partly on:
  a width of a field of view of the at least one sensor, and
  a width of the work surface.

6. The method of claim 1, wherein the at least one sensor is carried by the autonomous mobile machine and comprises at least one of an image capture device, a magnetic sensor, a LIDAR sensor, a RADAR sensor, and a SONAR sensor.

7. The method of claim 1, further comprising:
  receiving location information indicative of a location of the autonomous mobile machine and corresponding to the second sensor information, the location information being determined by a location sensor of the autonomous mobile machine while the slave machine performs the at least part of the second worksite plan; and
  determining a location of the slave machine based on a correlation between the location information and the second sensor information.

8. The method of claim 1, further comprising:
  determining that the safety metric satisfies a first threshold; and
  generating the accuracy metric based at least partly on determining that the safety metric satisfies the first threshold.

9. The method of claim 1, wherein generating the at least one of the safety metric and the accuracy metric comprises generating the safety metric, the method further comprising:
  determining that the safety metric satisfies a corresponding threshold;
  generating additional instructions based at least partly on determining that the safety metric satisfies the corresponding threshold;
  providing the additional instructions to the slave machine via a network; and
  receiving third sensor information determined by the at least one sensor, the third sensor information being indicative of the slave machine operating according to the additional instructions.

10. The method of claim 1, wherein generating the at least one of the safety metric and the accuracy metric comprises generating the safety metric, and the safety metric is indicative of a likelihood that at least part of the slave machine will contact an additional object disposed at the worksite while performing the at least part of the second worksite plan.

11. The method of claim 1, wherein the autonomous mobile machine is disposed, along the second mobile machine travel path, at least one of: 1) ahead of the slave machine, or 2) at least partly along side of the slave machine, while the slave machine performs the at least part of the second worksite plan.

12. The method of claim 1, wherein maintaining the component of the slave machine within the field of view of the at least one sensor comprises:
  maintaining a component of the slave machine, disposed at a front of the slave machine, within the field of view of the at least one sensor as the autonomous mobile machine traverses the second mobile machine travel path extending along the work surface.

13. A system, comprising:
  an autonomous mobile machine having at least one sensor;
  a first controller in communication with the at least one sensor; and
  a slave machine in communication with the first controller via a network, wherein the first controller is configured to:
    receive first sensor information associated with a work surface of a worksite, wherein the first sensor information is determined by the at least one sensor as the autonomous mobile machine traverses a first mobile machine travel path defined by the work surface;

generate a worksite plan based at least partly on the first sensor information and comprising a three-dimensional representation of an area of the worksite to be acted on by the slave machine;
provide instructions to the slave machine which, when executed by a second controller of the slave machine, cause the second controller to control the slave machine to perform at least part of the worksite plan at the area of the worksite;
cause the autonomous mobile machine to traverse a second mobile machine travel path extending along the work surface while the slave machine performs the at least part of the worksite plan, the first controller controlling the autonomous mobile machine, in real time, to:
 maintain a component of the slave machine within a field of view of the at least one sensor as the slave machine traverses a slave machine travel path defined by the at least part of the worksite plan, and
 maintain a desired distance from a frame of the slave machine as the slave machine traverses the slave machine travel path;
receive second sensor information determined by the at least one sensor, the second sensor information being indicative of the slave machine performing the at least part of the worksite plan at the area of the worksite; and
generate at least one of a safety metric and an accuracy metric based at least partly on the second sensor information.

14. The system of claim 13, wherein the first controller is carried by the autonomous mobile machine, and the first controller is in communication with the second controller via the network.

15. The system of claim 13, wherein generating the worksite plan comprises:
identifying the slave machine,
determining at least one characteristic of the slave machine, and
comparing the at least one characteristic to an additional worksite plan received by the first controller.

16. The system of claim 13, wherein the first controller is further configured to:
receive location information indicative of a location of the autonomous mobile machine and corresponding to the second sensor information, the location information being determined by a location sensor of the autonomous mobile machine while the slave machine performs the at least part of the second worksite plan; and
determine a location of the slave machine based on a correlation between the location information and the second sensor information.

17. The system of claim 13, wherein generating the at least one of the safety metric and the accuracy metric comprises generating the safety metric, and wherein the first controller is further configured to:
determine that the safety metric fails to satisfy a corresponding threshold; and
based at least partly on determining that the safety metric fails to satisfy the corresponding threshold, provide additional instructions to the slave machine which, when executed by the second controller, cause the second controller to at least one of reduce a current travel speed of the slave machine and stop the slave machine.

18. An autonomous mobile machine, comprising:
a first controller;
a communication device in communication with the first controller; and
at least one sensor in communication with the first controller, wherein the first controller is configured to:
 receive first sensor information associated with a work surface of a worksite, wherein the first sensor information is determined by the at least one sensor as the autonomous mobile machine traverses a first mobile machine travel path defined by the work surface;
 generate a worksite plan based at least partly on the first sensor information and comprising a three-dimensional representation of an area of the worksite to be acted on by a slave machine disposed at the worksite;
 provide, using the communication device and via a network, first instructions to the slave machine, wherein when the first instructions are executed by a second controller of the slave machine, the first instructions cause the second controller to control the slave machine to perform at least part of the worksite plan at the area of the worksite;
 cause the autonomous mobile machine to traverse a second mobile machine travel path extending along the work surface while the slave machine performs the at least part of the worksite plan, the first controller controlling the autonomous mobile machine, in real time, to:
  maintain a component of the slave machine within a field of view of the at least one sensor as the slave machine traverses a slave machine travel path defined by the at least part of the worksite plan, and
  maintain a desired distance from a frame of the slave machine as the slave machine traverses the slave machine travel path;
 receive second sensor information determined by the at least one sensor, the second sensor information being indicative of the slave machine performing the at least part of the worksite plan at the area of the worksite;
 generate at least one of a safety metric and an accuracy metric based at least partly on the second sensor information; and
 provide second instructions to the slave machine based at least partly on the at least one of the safety metric and the accuracy metric, the first controller providing the second instructions using the communication device and via the network.

19. The autonomous mobile machine of claim 18, further comprising a location sensor configured to determine a location of the autonomous mobile machine at the worksite, the first controller being configured to generate the worksite plan based at least partly on the first sensor information and location information determined by the location sensor as the autonomous mobile machine traverses the mobile machine travel path.

20. The autonomous mobile machine of claim 18, wherein the first controller is further configured to:
determine that the safety metric fails to satisfy a corresponding threshold; and
generate the second instructions based at least partly on determining that the safety metric fails to satisfy the corresponding threshold.

21. The autonomous mobile machine of claim 20, wherein the first controller is further configured to receive third sensor information determined by the at least one sensor, the third sensor information being indicative of the slave machine operating according to the second instructions.

22. The autonomous mobile machine of claim 18, wherein the first controller is further configured to:
  receive location information indicative of a location of the autonomous mobile machine and corresponding to the second sensor information, the location information being determined by a location sensor of the autonomous mobile machine while the slave machine performs the at least part of the second worksite plan; and
  determine a location of the slave machine based on a correlation between the location information and the second sensor information.

\* \* \* \* \*